US008476373B2

(12) United States Patent  (10) Patent No.: US 8,476,373 B2
Layman, Jr. et al.  (45) Date of Patent: Jul. 2, 2013

(54) BRANCHED AND STAR-BRANCHED STYRENE POLYMERS, TELOMERS, AND ADDUCTS, THEIR SYNTHESIS, THEIR BROMINATION, AND THEIR USES

(75) Inventors: William J. Layman, Jr., Baton Rouge, LA (US); Charles H. Kolich, Baton Rouge, LA (US); Arthur G. Mack, Prairieville, LA (US); Jonathan P. McCarney, Baton Rouge, LA (US); Govindarajulu Kumar, Baton Rouge, LA (US); Jorge Morice, Baton Rouge, LA (US); Zhongxin Ge, Baton Rouge, LA (US); Bo Liu, Nanjing (CN); Douglas W. Luther, Walker, LA (US); Kimberly M. White, Baton Rouge, LA (US); Junzuo Wang, Little Rock, AR (US); Ravindra R. Joshi, Stevenson Ranch, CA (US); Hoover B. Chew, Summerville, SC (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 13/130,105

(22) PCT Filed: Nov. 30, 2009

(86) PCT No.: PCT/US2009/066132
§ 371 (c)(1),
(2), (4) Date: Sep. 13, 2011

(87) PCT Pub. No.: WO2010/065467
PCT Pub. Date: Jun. 10, 2010

(65) Prior Publication Data
US 2011/0224320 A1 Sep. 15, 2011

Related U.S. Application Data

(60) Provisional application No. 61/119,285, filed on Dec. 2, 2008.

(51) Int. Cl.
*C08F 112/08* (2006.01)
*C08F 12/08* (2006.01)
*C08L 25/06* (2006.01)
*C07C 17/06* (2006.01)

(52) U.S. Cl.
USPC ...................................................... 525/333.4

(58) Field of Classification Search
USPC ...................................................... 525/333.4
See application file for complete search history.

(56) References Cited

U.S. PATENT DOCUMENTS

| 2,243,543 A | 5/1941 | ter Horst |
| 2,757,146 A | 7/1956 | Fawcett |
| 2,914,489 A | 11/1959 | Hall |
| 2,954,412 A | 9/1960 | Wulf et al. |
| 3,221,068 A | 11/1965 | Gorham |
| 3,372,880 A | 3/1968 | O'Hara |
| 3,373,135 A | 3/1968 | Jenkner et al. |
| 3,451,988 A | 6/1969 | Langer, Jr. |
| 3,458,586 A | 7/1969 | Langer, Jr. |
| 3,536,679 A | 10/1970 | Langer, Jr. |
| 3,541,149 A | 11/1970 | Langer, Jr. |
| 3,594,396 A | 7/1971 | Langer, Jr. |
| 3,634,548 A | 1/1972 | Harwell et al. |
| 3,668,263 A | 6/1972 | Morrison et al. |
| 3,725,368 A | 4/1973 | Morrison et al. |
| 3,742,077 A | 6/1973 | Kamienski et al. |
| 3,751,384 A | 8/1973 | Langer, Jr. |
| 3,751,501 A | 8/1973 | Kamienski et al. |
| 3,850,882 A | 11/1974 | Underwood et al. |
| 3,943,195 A | 3/1976 | Naarmann et al. |
| 4,041,088 A | 8/1977 | Bach et al. |
| 4,074,032 A | 2/1978 | Naarmann et al. |
| 4,078,019 A | 3/1978 | Langer, Jr. |
| 4,107,231 A | 8/1978 | Wurmb et al. |
| 4,108,921 A | 8/1978 | Langer, Jr. |
| 4,129,551 A | 12/1978 | Rueter et al. |
| 4,129,705 A | 12/1978 | de Zarauz |
| 4,134,938 A | 1/1979 | Langer, Jr. |
| 4,137,212 A | 1/1979 | Theysohn et al. |
| 4,143,221 A | 3/1979 | Naarmann et al. |
| 4,151,223 A | 4/1979 | Neuberg et al. |
| 4,200,702 A | 4/1980 | Gausepohl et al. |
| 4,268,705 A | 5/1981 | Palmer |
| 4,311,818 A | 1/1982 | Sigwalt et al. |
| 4,360,455 A | 11/1982 | Lindenschmidt et al. |
| 4,435,312 A | 3/1984 | Lecolier et al. |
| 4,450,259 A | 5/1984 | Roggero et al. |

(Continued)

FOREIGN PATENT DOCUMENTS

| CN | 100369941 C | 2/2008 |
| DE | 1570376 | 7/1969 |
| DE | 19516563 A1 | 11/1996 |
| EP | 0000141 | 1/1979 |
| EP | 0002514 B2 | 6/1979 |
| EP | 0277429 B1 | 8/1988 |
| EP | 0334715 | 9/1989 |
| EP | 0741147 A1 | 11/1996 |
| EP | 0775719 A2 | 5/1997 |
| EP | 0806437 | 11/1997 |

(Continued)

OTHER PUBLICATIONS

Wunsch, J.R., "Polystyrene Synthesis, Production and Applications", Rapra Review Reports, 2000, vol. 10, No. 4, pp. 14-15.
Eberhardt, G. G., et al., "A Catalytic Telomerization Reaction of Ethylene with Aromatic Hydrocarbons", J. Org. Chem., vol. 29, 1964, pp. 2928-2932.

(Continued)

Primary Examiner — Jeffrey Mullis
(74) Attorney, Agent, or Firm — Jeremy J. Kliebert

(57) ABSTRACT

New branched or star-branched styrene polymeric, telomeric, and monomeric product distributions, their preparation, their use as raw materials for bromination to produce flame retardants, the flame retardants themselves, and their use as flame retardants in various polymeric substrates are described.

9 Claims, No Drawings

U.S. PATENT DOCUMENTS

| | | | |
|---|---|---|---|
| 4,463,135 A | 7/1984 | Maly |
| 4,482,677 A | 11/1984 | Teranaka et al. |
| 4,535,135 A | 8/1985 | Lecolier et al. |
| 4,636,540 A | 1/1987 | Warfel |
| 4,701,498 A | 10/1987 | Roggero et al. |
| 4,734,461 A | 3/1988 | Roggero et al. |
| 4,753,745 A | 6/1988 | Kostusyk et al. |
| 4,755,573 A | 7/1988 | Aycock |
| 4,829,135 A | 5/1989 | Gunesin et al. |
| 4,853,440 A | 8/1989 | Roggero et al. |
| 4,883,846 A | 11/1989 | Moore et al. |
| 4,950,721 A | 8/1990 | Dias et al. |
| 4,975,496 A | 12/1990 | Tigner et al. |
| 5,112,897 A | 5/1992 | Dever et al. |
| 5,112,898 A | 5/1992 | Dever et al. |
| 5,196,622 A | 3/1993 | Pettijohn et al. |
| 5,198,594 A | 3/1993 | Lillwitz et al. |
| 5,302,768 A | 4/1994 | Hussain |
| 5,310,858 A | 5/1994 | Greiner et al. |
| 5,326,836 A | 7/1994 | Hwang et al. |
| 5,457,248 A | 10/1995 | Mack et al. |
| 5,625,017 A | 4/1997 | Morita et al. |
| 5,637,650 A | 6/1997 | Gill et al. |
| 5,654,384 A | 8/1997 | Halasa et al. |
| 5,677,390 A | 10/1997 | Dadgar et al. |
| 5,686,538 A | 11/1997 | Balhoff et al. |
| 5,687,090 A | 11/1997 | Chen et al. |
| 5,728,782 A | 3/1998 | Brady et al. |
| 5,741,949 A | 4/1998 | Mack |
| 5,767,203 A | 6/1998 | Ao et al. |
| 5,852,131 A | 12/1998 | Balhoff et al. |
| 5,852,132 A | 12/1998 | Dadgar et al. |
| 5,902,865 A | 5/1999 | Gausepohl et al. |
| 5,916,978 A | 6/1999 | Ao et al. |
| 6,008,283 A | 12/1999 | Rose et al. |
| 6,025,450 A | 2/2000 | Lawson et al. |
| 6,093,211 A | 7/2000 | Hamielec et al. |
| 6,133,381 A | 10/2000 | Reed et al. |
| 6,207,765 B1 | 3/2001 | Ao et al. |
| 6,232,393 B1 | 5/2001 | Dadgar et al. |
| 6,232,408 B1 | 5/2001 | Dadgar et al. |
| 6,235,831 B1 | 5/2001 | Reed et al. |
| 6,235,844 B1 | 5/2001 | Dadgar et al. |
| 6,313,230 B1 | 11/2001 | Tsai et al. |
| 6,326,439 B1 | 12/2001 | Dadgar et al. |
| 6,348,166 B1 | 2/2002 | Knoll et al. |
| 6,355,194 B1 | 3/2002 | Agur et al. |
| 6,362,293 B1 | 3/2002 | Newman et al. |
| 6,521,714 B2 | 2/2003 | Kolich et al. |
| 6,657,028 B1 | 12/2003 | Aplin et al. |
| 6,759,498 B2 | 7/2004 | Ikematsu et al. |
| 6,767,960 B2 | 7/2004 | Bae et al. |
| 6,933,343 B2 | 8/2005 | Ikematsu et al. |
| 7,288,612 B2 | 10/2007 | Desbois et al. |
| 7,351,777 B2 | 4/2008 | Moore et al. |
| 7,425,290 B2 | 9/2008 | Semen |
| 7,632,893 B2 | 12/2009 | Kolich et al. |
| 2002/0035214 A1 | 3/2002 | Gill et al. |
| 2002/0183465 A1 | 12/2002 | Babcock et al. |
| 2005/0143526 A1 | 6/2005 | Faust et al. |
| 2005/0209408 A1 | 9/2005 | Lee et al. |
| 2006/0079644 A1 | 4/2006 | Meyer et al. |
| 2007/0004870 A1 | 1/2007 | Kolich et al. |
| 2007/0142566 A1 | 6/2007 | Kolich et al. |
| 2007/0185280 A1 | 8/2007 | Luther |
| 2007/0232759 A1 | 10/2007 | Chun et al. |
| 2010/0184941 A1 | 7/2010 | Layman, Jr. et al. |

FOREIGN PATENT DOCUMENTS

| | | |
|---|---|---|
| GB | 1107898 | 3/1968 |
| GB | 1174845 | 12/1969 |
| GB | 1270318 | 4/1972 |
| GB | 1342101 | 12/1973 |
| GB | 1536762 | 12/1978 |
| GB | 1589700 | 5/1981 |
| GB | 2164051 A1 | 3/1986 |
| JP | 59-155454 | 9/1984 |
| JP | 62-042938 A | 2/1987 |
| JP | 08 188622 | 7/1996 |
| JP | 09-249705 A1 | 9/1997 |
| JP | 09-249706 A1 | 9/1997 |
| JP | 10-182730 A1 | 7/1998 |
| JP | 11-043511 A1 | 2/1999 |
| JP | 11-080220 A1 | 3/1999 |
| JP | 11-116613 A1 | 4/1999 |
| JP | 2001-341246 A1 | 12/2001 |
| WO | 90/15095 A1 | 12/1990 |
| WO | 99/25746 A1 | 5/1999 |
| WO | 99/55770 A1 | 11/1999 |
| WO | 00/15678 A1 | 3/2000 |
| WO | 02/072645 A1 | 9/2002 |
| WO | 03/020826 A1 | 3/2003 |
| WO | 2005/118245 A1 | 12/2005 |
| WO | 2007/005233 A1 | 1/2007 |
| WO | 2007/076369 A1 | 7/2007 |
| WO | 2008/011477 A1 | 1/2008 |
| WO | 2008/066970 A1 | 6/2008 |
| WO | 2008/154453 A1 | 12/2008 |
| WO | 2008/154454 A1 | 12/2008 |
| WO | 2009/148464 A1 | 12/2009 |
| WO | 2010/065462 A1 | 6/2010 |
| WO | 2010/065464 A1 | 6/2010 |
| WO | 2010/065467 A1 | 6/2010 |
| WO | 2010/065468 A1 | 6/2010 |
| WO | 2010/127072 A1 | 11/2010 |
| WO | 2010/127087 A1 | 11/2010 |
| WO | 2010/127091 A1 | 11/2010 |

OTHER PUBLICATIONS

Eberhardt, G. G., et al., "Telomerization Reactions Involving a N-Chelated Organo Lithium Catalyst", Polymer Preprints, 1972, vol. 13, pp. 667-671.

Feil, F., et al., "Benzyl Complexes of the Heavier Alkaline-Earth Metals: The First Crystal Structure of a Dibenzylstrontium Complex", Organometallics, 2001, vol. 20, pp. 4616-4622.

CAPLUS Abstract of Fujimoto, T., et al., "Preparation of monodisperse polystyrenes with high molecular weights", Polymer Journal, 1975, 7(3), pp. 397-401. 1 page.

Gatzke, A.L., "Chain Transfer in Anionic Polymerization. Determination of Chain-Transfer Constants by Using Carbon-14-Labeled Chain Transfer Agents", Journal of Polymer Science, Part A-1, 1969, vol. 7, pp. 2281-2292.

Science Direct Abstract of Helary, G., et al., "Etude de la polymerisation anionique du styrene en milieu non polaire, en presence de N,N,N',N' tetramethyl ethylene diamine", European Polymer Journal, 1978, vol. 14, issue 5, pp. 345-348. 1 page.

Hennion, G. F., et al., "The Polybromination of Alkylbenzenes", J. Am. Chem. Soc., 1946, vol. 68, issue 3, pp. 424-426.

CAPLUS Abstract of Ito, M., et al., "Synthesis of well-defined block copolymers containing poly(N-isopropylacrylamide) segment by anionic block copolymerization of N-methoxymethyl-N-isopropylacrylamide", Designed Monomers and Polymers, 2004, 7(1-2), pp. 11-24. 1 page.

Junkui, C., "Synthesis of Narrow Distribution Polystyrene in RLi-Ligand Complex Systems", Chemical Journal of Chinese Universities, 1989, vol. 10, No. 12, pp. 1246-1250. Abstract only translated.

CAPLUS Abstract of Kalnins, K., et al., "Electronic structure of complexes of benzyl anion and ion pairs with styrene", Vysokimolekulyarnye Soedineniya, Seriya A (1990), 32(2), 316-21. 1 page.

Lamneck, Jr., J. H., "Bromination of the Two Propylbenzenes and Three Butylbenzenes", J. Am. Chem. Soc., 1954, vol. 76, issue 4, pp. 1106-1107.

CAPLUS Abstract of Langer, A. W., Jr., "Reactions of Chelated Organolithium Compounds", Transactions of the New York Academy of Sciences, 1965, 27(7), pp. 741-747. 1 page.

Marechal, Jean-Marc, et al., "Stereoregulation in the anionic polymerization of styrene initiated by superbases", Polymer, 2003, vol. 44, pp. 7601-7607.

Marechal, Jean-Marc, et al., "Stereospecific anionic polymerization of styrene initiated by R2Mg/ROMt 'ate' complexes", Polymer, 2004, 45, pp. 4641-4646.

Maruoka, K., et al., "Novel Anionic Oligomerization by a New, Sequential Generation of Organolithium Compounds", Macromolecules, 1996, 29, pp. 3328-3329.

Milner, R., et al., "Anionic telomerization of butadiene with toluene and diphenylmethane: microstructure and molecular weight", Polymer, vol. 26, 1985, pp. 1265-1267.

Mizuno, T., et al., "Second and Third Virial Coefficients of Polystyrene with Benzyl Ends near the Theta Point", Macromolecules, 2005, 38, pp. 4432-4437.

Advanced Organic Chemistry, Reactions, Mechanisms, and Structure, 4th Ed., Jerry March, J. Wiley & Sons, 1992, pp. 743-744.

Atkins, Physical Chemistry, P. W., 4th Ed., W. H. Freeman and Co., 1990, p. 800.

Baskaran, D., et al., "Effect of Chelation of the Lithium Cation on the Anionic Polymerization of Methyl Methacrylate Using Organolithium Initiators", Macromolecules, 1995, 28, pp. 7315-7317.

Bildmann, U. J., et al., "Synthesis and Structure of the Tmeda Adduct of a Dibenzyl Lithiate Anion Containing Four-Coordinate Lithium", Organometallics, 2001, 20, pp. 1689-1691.

CAPLUS Abstract of Chakrapani, S., et al., "Strategies for the controlled, living anionic polymerization of acrylic and methacrylic monomers and novel star polymers", Polymer Science, 1994, vol. 1, pp. 112-117. 1 page.

CAPLUS Abstract of Morton, M., "Homogeneous anionic polymerization. II. Molecular weight of polystyrene initiated by lithium alkyls", Journal of Polymer Science, 1963, Part A-1, pp. 461-474. 1 page.

CAPLUS Abstract of Narita, T., et al., "Reactivity of butyllithium-MeOCH2CH2OLi System as catalyst for copolymerization of styrene with 1,3-butadiene", Journal of Macromolecular Science, Chemistry, 1970, 4(2), pp. 277-294. 1 page.

Patterman, S. P., et al., "Pi Complexation in Ion Pair Bonding. The Structure of Benzyllithium Triethylenediamine", J. Am. Chem. Soc., 1970, 92:5, pp. 1150-1157.

Pines, H., et al., "Sodium-catalyzed side chain aralkylation of alkylbenzenes with Styrene", J. Am. Chem. Soc, 1958, vol. 80(22), pp. 6001-6004.

Pines, H., et al., "Sodium Catalyzed Reactions. II. Side-chain Ethylation of Alkyl Aromatic Hydrocarbons Catalyzed by Sodium", J. Am. Chem. Soc., 1955, vol. 77(3), pp. 554-559.

Reed, J. N., "Product Subclass 13: Benzyllithium Compounds and (Lithiomethyl)Hetarenes", Science of Synthesis, 2006 (vol date 2005), vol. 8A, pp. 329-355.

Seki, A., et al., "Crossed aldol reaction using cross-linked polymer-bound lithium dialkylamide", Tetrahedron, 2004, vol. 60, pp. 5001-5011.

Sorenson, W. R., et al., Preparative Methods of Polymer Chemistry, Interscience Publishers, Inc., 1961, pp. 198-200.

Strohmann, C., et al., "A Highly Diastereomerically Enriched Benzyllithium Compound: The Molecular Structure and the Stereochemical Course of Its Transformations", Organometallics, 2002, vol. 21, pp. 3079-3081.

Tsukahara, Y., et al., "Preparation and Characterization of alpha-benzyl-omega-vinylbenzyl Polystyrene Macromonomer", Polymer Journal, 1994, vol. 26, No. 9, pp. 1013-1018.

CAPLUS Abstract of Waack, R., et al., "Effects of lithium halides on the reactivity of organolithium compounds (in polymerization)", Chemistry & Industry, 1964, vol. 12, pp. 496-497. 1 page.

Waack, R., et al., "Reactivities of Organolithium Compounds in Tetrahydrofuran. I. As Vinyl Polymerization Initiators", J. Org. Chem., 1967, 32(11), pp. 3395-3399.

Wilhelm, D., et al., "Reactions of Polyanions Derived from Alkylbenzenes", J. Am. Chem. Soc., 1984, 106, pp. 361-367.

Concise, Polymeric Materials Encyclopedia, Editor-in-Chief, Joseph C. Salamone, CRC Press, 1999, pp. 1305-1307.

BRANCHED AND STAR-BRANCHED STYRENE POLYMERS, TELOMERS, AND ADDUCTS, THEIR SYNTHESIS, THEIR BROMINATION, AND THEIR USES

REFERENCE TO RELATED APPLICATIONS

This application is the National Stage of International Patent Appl. No. PCT/US2009/066132 filed on Nov. 30, 2009, which in turn claims the benefit of U.S. Provisional Patent Appl. No. 61/119,285, filed on Dec. 2, 2008, the disclosures of which are incorporated herein by reference.

TECHNICAL FIELD

This invention relates to a new process enabling production of branched and/or star-branched styrene polymers telomers and adducts anionically and via chain transfer. Such products are deemed to be excellent substrates for preparing flame retardant additives by subjecting such polymers or telomers or adducts to aromatic bromination.

BACKGROUND

A variety of flame retardant compounds are available as articles of commerce. Despite extensive research over the years, the art still continues to search for new aromatic hydrocarbons which can be readily brominated to produce highly effective brominated aromatic flame retardants. Some of the latest developments in the art involve new process technology for bromination of linear styrenic polymers formed by anionically-initiated polymerization of styrene.

This invention is believed to provide new technology for producing branched and/or star-branched styrene polymers or telomers or adducts anionically and via chain transfer, which polymers or telomers or adducts, on bromination, will provide the art with novel, highly-effective brominated aromatic flame retardants.

In connection with products of this invention and terminology used anywhere in this document, including the claims:
1) the term "styrene polymer", whether in the singular or plural, denotes styrene branched and/or star-branched addition product(s) having degrees of polymerization in the range of greater than about 0.85 and having greater than about 10 GPC area % of the molecular weight distribution having an $M_w$ greater than 620 Daltons; and
2) the term "styrene telomer", whether in the singular or plural, denotes styrene branched and/or star-branched addition product(s) having degrees of polymerization in the range of about 0 to about 1.1 and having less than about 10 GPC area % of the molecular weight distribution having an $M_w$ greater than 620 Daltons; and
3) the term "styrene adduct", whether in the singular or plural, denotes styrene branched and/or star-branched addition product(s) having degrees of polymerization equal to 0. That is to say there are no styrene repeat units present in the distribution.

The value of "degrees of polymerization" can be satisfactorily estimated by calculating as if the material was a linear polymer. The calculation is, therefore, a reasonable approximation. For a polymer in which a xylene, a trimethylbenzene, or a tetramethylbenzene is the chain transfer agent(s) (hereinafter referred to in the singular or plural as CTA), the respective number average degrees of polymerization (DP) are calculated from the $M_n$, or weighted averages thereof, of the particular product distribution according to the equations:

$$DP_{xylene}=(M_n-210)/104$$

$$DP_{trimethylbenzene}=(M_n-224)/104$$

$$DP_{tetramethylbenzene}=(M_n-238)/104$$

In each case, the above polymers or telomers or adducts are produced by controlled reactions involving both anionic initiation and chain transfer.

BRIEF NON-LIMITING SUMMARY OF THE INVENTION

This invention provides, among other things, a process for preparing branched or star-branched styrene polymers and/or polymers, which process comprises:
A) bringing together at least one polymethylated aromatic hydrocarbon and a catalytic quantity of at least one alkyllithium catalyst and at least one aliphatic poly(tertiary amine) promoter in an inert hydrocarbon solvent; and
B) bringing at least one styrene hydrocarbon into contact with product formed in A) at a rate such that at least one branched or star-branched styrene polymer and/or polymer is formed.

Without desiring to be bound by theory, it is believed that in step A) at least one aliphatic poly(tertiary) amine complexed side-chain lithiated polymethylated aromatic hydrocarbon product is formed as a reactive intermediate, and that such formation is assisted by the formation of one or more complexes between the one or more alkyllithium catalysts and the one or more aliphatic tertiary amine promoters that are brought together in the mixture formed. The formation of such reactive intermediate product in turn enables reaction with the styrene hydrocarbon being brought into contact with such reactive intermediate whereby formation of branched or star-branched styrene polymer(s) or branched or star-branched styrene telomer(s) or styrene adduct(s) occurs.

Also provided by this invention are new branched or star-branched styrene polymeric, telomeric, and monomeric product distributions. Such product distributions comprise one or more styrene polymer distributions, or one or more styrene telomer distributions, or one or more styrene-derived adduct distributions having a $M_n$ in the range of about 211 to about 1050, $M_w$ in the range of about 211 to about 2600 and $M_z$ in the range of about 211 to about 3500 with a polydispersity (PD) in the range of 1.000 to about 2.000 of this invention and comprise at least one or more discrete molecules represented by Formula (I) below:

$$(CH_3)_bC_6H_k(CH_2(CH_2CHC_6H_5)_nCH_2CH_2C_6H_5)_c \qquad (I)$$

wherein:
each $C_6H_5$ is a phenyl group and each $C_6H_k$ is a substituted phenyl group;
n is a whole number and is independently in the range of $0 \leq n \leq 8$;
k is a whole number independently equal to 2, 3 or 4;
b is a whole number independently equal to 0, 1, 2 or 3;
c is a whole number independently equal to 1, 2, 3 or 4; and
the sum of k+b+c=6 for any discrete molecule.

Especially preferred new compositions of this invention are composed of branched and/or star-branched telomer distribution having an $M_n$ in the range of about 300 to about 1050, an $M_w$ in the range of about 350 to about 2600 and an $M_z$ in the range of about 400 to about 3500 with a PD in the range of about 1.1 to about 2.0 and which comprise at least one compound represented by Formula (II) below:

$$(CH_3)_bC_6H_k(CH_2(CH_2CHC_6H_5)_nCH_2CH_2C_6H_5)_c \qquad (II)$$

wherein:
each $C_6H_5$ is a phenyl group and each $C_6H_k$ is a substituted phenyl group;
n is a whole number and is independently in the range of $0 \leq n \leq 8$;

k is a whole number independently equal to 2, 3 or 4;
b is a whole number independently equal to 0, 1, 2 or 3;
c is a whole number independently equal to 1, 2, 3 or 4; and
the sum of k+b+c=6 for any discrete molecule.

A second group of especially preferred new compositions of this invention are composed of branched and/or star-branched telomer distributions having an $M_n$ in the range of about 212 to about 490, an $M_w$ in the range of about 212 to about 2300 and an $M_z$ in the range of about 226 to about 2800 with a PD in the range of about 1.002 to about 1.150 and which comprise at least one compound represented by Formula (III) below:

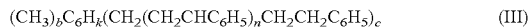
$$(CH_3)_bC_6H_k(CH_2(CH_2CHC_6H_5)_nCH_2CH_2C_6H_5)_c \quad (III)$$

wherein:
each $C_6H_5$ is a phenyl group and each $C_6H_k$ is a substituted phenyl group;
n is a whole number and is independently in the range of $0 \leq n \leq 3$;
k is a whole number independently equal to 2, 3 or 4;
b is a whole number independently equal to 0, 1, 2 or 3;
c is a whole number independently equal to 1, 2, 3 or 4; and
the sum of k+b+c=6 for any discrete molecule.

A third group of especially preferred new compositions of this invention are composed of branched and/or star-branched distributions of one or more adducts having an $M_n$ in the range of about 211 to about 511, an $M_w$ in the range of about 211 to about 511 and an $M_z$ in the range of about 211 to about 511 with a PD in the range of 1.000 to about 1.100 and which comprise at least one compound represented by Formula (IV) below:

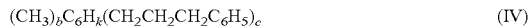
$$(CH_3)_bC_6H_k(CH_2CH_2CH_2C_6H_5)_c \quad (IV)$$

wherein:
each $C_6H_5$ is a phenyl group and each $C_6H_k$ is a substituted phenyl group;
k is a whole number independently equal to 2, 3 or 4;
b is a whole number independently equal to 0, 1, 2 or 3;
c is a whole number independently equal to 1, 2, 3 or 4; and
the sum of k+b+c=6 for any discrete molecule.

Also provided by this invention are new branched or star-branched styrene polymeric, telomeric, and monomeric product distributions of this invention, the structure of which is given in Formula V below. These particular materials tend to be produced in small quantities as coproducts during a process of this invention. Their copresence results from the fact that the process involves chain transfer primarily on a methyl group but at times can also occur on the aromatic ring. Typically, the amount of such coproducts, if present, in the product distributions of this invention may be in the range of 0 to 5 GPC area %, and preferably is in the range of 0.1 to 2 GPC area %.

Such coproducts can be represented by the formula:

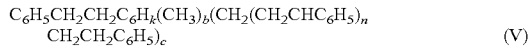
$$C_6H_5CH_2CH_2C_6H_k(CH_3)_b(CH_2(CH_2CHC_6H_5)_n CH_2CH_2C_6H_5)_c \quad (V)$$

wherein:
each $C_6H_5$ is a phenyl group and each $C_6H_{k-1}$ is a substituted phenyl group;
n is a whole number and is in the range of $0 \leq n \leq 8$;
k is a whole number independently equal to 1, 2 or 3;
b is a whole number independently equal to 0, 1, 2, 3 or 4;
c is a whole number independently equal to 1, 2, 3 or 4; and
the sum of k+b+c=5 for any discrete molecule.

The product distributions which contain these coproducts have the same molecular weight distributions as given above in connection with the distributions represented for Formulas (I), (II), (III), and (IV).

Also provided by this invention are processes for producing and for brominating the above distributions of this invention. This invention still further provides, among other things, a brominated flame retardant composition which comprises a brominated aromatic product distribution of this invention of the formula:

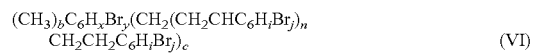
$$(CH_3)_bC_6H_xBr_y(CH_2(CH_2CHC_6H_iBr_j)_n CH_2CH_2C_6H_iBr_j)_c \quad (VI)$$

wherein:
each $C_6H_iBr_j$ is a brominated phenyl group and each $C_6H_xBr_y$ is a brominated substituted phenyl group;
n is a whole number and is independently in the range of $0 \leq n \leq 8$;
x is a whole number equal to 0 to 4;
y is a whole number equal to 0 to 4;
b is a whole number independently equal to 0, 1, 2 or 3;
c is a whole number independently equal to 1, 2, 3 or 4;
i is a whole number equal to 0 to 5:
j is a whole number equal to 0 to 5; and
the sum of x+y+b+c=6 and the sum of i+j=5 for any discrete molecule,
and wherein said distribution is further characterized by having an $M_n$ in the range of about 420 to about 3300, an $M_w$ in the range of about 420 to about 6250, an $M_z$ in the range of about 420 to about 10937, and a PD in the range of about 1.00 to about 2.00 the weight percent of bromine as determined by XRF in the brominated product distribution of this invention is in the range of about 50 wt % to about 79 wt %.

A preferred brominated flame retardant composition, which comprises a brominated aromatic substrate distribution of this invention of the formula:

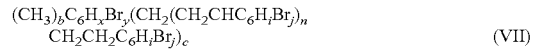
$$(CH_3)_bC_6H_xBr_y(CH_2(CH_2CHC_6H_iBr_j)_n CH_2CH_2C_6H_iBr_j)_c \quad (VII)$$

wherein:
each $C_6H_iBr_j$ is a brominated phenyl group and each $C_6H_xBr_y$ is a brominated substituted phenyl group;
n is a whole number and is independently in the range of $0 \leq n \leq 8$;
x is a whole number equal to 0 to 4;
y is a whole number equal to 0 to 4;
b is a whole number independently equal to 0, 1, 2 or 3;
c is a whole number independently equal to 1, 2, 3 or 4;
i is a whole number equal to 0 to 5:
j is a whole number equal to 0 to 5; and
the sum of x+y+b+c=6 and the sum of i+j=5 for any discrete molecule,
and wherein said distribution is further characterized by having an $M_n$ in the range of about 900 to about 3300, an $M_w$ in the range of about 1100 to about 6600, an $M_z$ in the range of about 1250 to about 11000, and a PD in the range of about 1.0 to about 2.0 the weight percent of bromine as determined by XRF in the brominated product distribution of this invention is in the range of about 68 wt % to about 74 wt %.

Another preferred brominated flame retardant composition of this invention comprises a brominated aromatic substrate distribution of this invention of the formula:

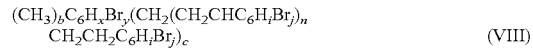
$$(CH_3)_bC_6H_xBr_y(CH_2(CH_2CHC_6H_iBr_j)_n CH_2CH_2C_6H_iBr_j)_c \quad (VIII)$$

wherein:
each $C_6H_iBr_j$ is a brominated phenyl group and each $C_6H_xBr_y$ is a brominated substituted phenyl group;
n is a whole number and is independently in the range of $0 \leq n \leq 4$;
x is a whole number equal to 0 to 4;
y is a whole number equal to 0 to 4;

b is a whole number independently equal to 0, 1, 2 or 3;
c is a whole number independently equal to 1, 2, 3 or 4;
i is a whole number equal to 0 to 5:
j is a whole number equal to 0 to 5; and
the sum of x+y+b+c=6 and the sum of i+j=5 for any discrete molecule, and wherein said distribution is further characterized by having an $M_n$ in the range of about 420 to about 2300, an $M_w$ in the range of about 420 to about 3100, an $M_z$ in the range of about 452 to about 4000, and a PD in the range of about 1.00 to about 2.00 the weight percent of bromine as determined by XRF in the brominated product distribution of this invention is in the range of about 50 wt % to about 79 wt %.

Still another preferred brominated flame retardant composition of this invention comprises a brominated aromatic substrate adduct distribution of this invention of the formula:

$$(CH_3)_b C_6 H_x Br_y (CH_2 CH_2 CH_2 C_6 H_i Br_j)_c \quad (IX)$$

wherein:
each $C_6H_iBr_j$ is a brominated phenyl group and each $C_6H_xBr_y$ is a brominated substituted phenyl group;
x is a whole number equal to 0 to 4;
y is a whole number equal to 0 to 4;
b is a whole number independently equal to 0, 1, 2 or 3;
c is a whole number independently equal to 1, 2, 3 or 4;
i is a whole number equal to 0 to 5;
j is a whole number equal to 0 to 5; and
the sum of x+y+b+c=6 and the sum of i+j=5 for any discrete molecule, and wherein y is on average less than about 2; i is on average less than about 2; and wherein said distribution is further characterized by having an $M_n$ in the range of about 420 to about 1420, an $M_w$ in the range of about 420 to about 1420, an $M_z$ in the range of about 420 to about 1420, and a PD in the range of about 1.00 to about 2.00 the weight percent of bromine as determined by XRF in the brominated product distribution of this invention is in the range of about 45 wt % to about 61 wt % (when the composition is used in the absence of an antimony synergist, such as antimony oxide) and in the range of about 45 wt % to about 79 wt % (when the composition is used in the presence of a flame retardant synergist).

Also provided by this invention are new brominated branched or star-branched styrene polymeric, telomeric, and monomeric product distributions of this invention, the structure of which is given in Formula X below. These particular materials tend to be present in products of Formulas (VI) through (IX) in small quantities as coproducts. Typically, the amount of such coproducts, if present, in the product distributions of this invention may be in the range of 0 to 5 GPC area %, and preferably is in the range of 0.1 to 2 GPC area %.

Such brominated coproducts can be represented by the formula:

$$C_6H_iBr_jCH_2CH_2C_6H_{x-1}Br_y(CH_3)_b(CH_2(CH_2CHC_6H_iBr_j)_n CH_2CH_2C_6H_iBr_j)_c \quad (X)$$

wherein:
each $C_6H_iBr_j$ is a brominated phenyl group and each $C_6H_{x-1}Br_y$ is a brominated substituted phenyl group;
n is a whole number and is independently in the range of $0 \leq n \leq 8$;
x is a whole number equal to 0 to 4;
y is a whole number equal to 0 to 4;
b is a whole number independently equal to 0, 1, 2, 3 or 4;
c is a whole number independently equal to 1, 2, 3 or 4;
i is a whole number equal to 0 to 5:
j is a whole number equal to 0 to 5; and
the sum of x+y+b+c=5 and the sum of i+j=5 for any discrete molecule.

Other features and embodiments of this invention will be still further apparent from the ensuing description and appended claims.

FURTHER DETAILED DESCRIPTION OF THE INVENTION

Reference is made herein, including the claims to branched and star-branched polymers, telomers, and adducts. By such terms is meant that the overall configuration of the product may be visualized to be in accordance with the following illustrative simplified and non-limiting chemical structures:

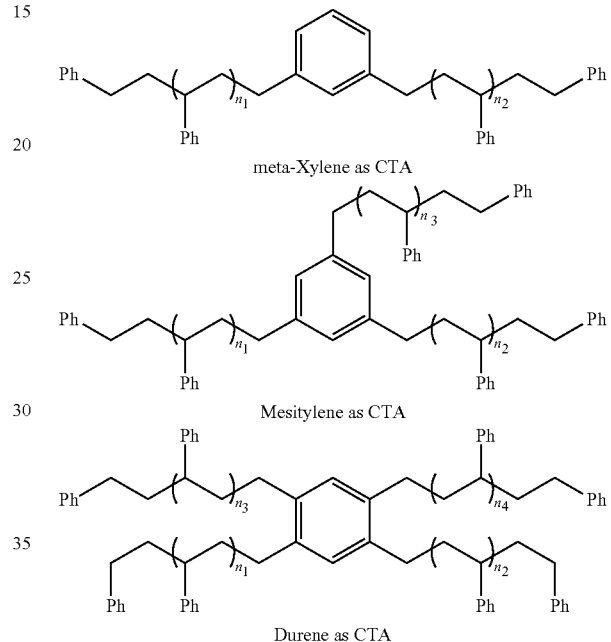

meta-Xylene as CTA

Mesitylene as CTA

Durene as CTA

The above formulas are presented for purposes of illustration, but are not intended to designate any particular stereoregularity of the molecules.

Process Technology for Producing the Branched and/or Star-Branched Distributions of this Invention The processes for producing a composition as above comprise:
A) feeding styrene into an agitated reaction mixture formed from components comprising one or more polymethylbenzenes having 2 to 4 methyl groups in the molecule, which function(s) as a chain transfer agent, alkyllithium, and N,N,N',N'-tetramethylethylenediamine (TMEDA), at rates of (i) moles of styrene/moles of CTA/hour in the range of about 0.15 to about 3.0 and (ii) moles of styrene/moles of alkyllithium/hour in the range of about 15 to about 150; with a molar ratio of styrene:CTA in the range of about 0.1 to about 10, a molar ratio of styrene:alkyllithium in the range of about 60 to about 360, and a molar ratio of TMEDA:alkyllithium in the range of about 0.9 to about 8; and maintaining the temperature of the reaction mixture in the range of about 70° C. to about 120° C.; the agitation being at least sufficient to maintain a substantially homogeneous concentration profile in the reaction mixture;
B) quenching the reaction mixture while at a temperature of below about 95° C. with a protic solvent which, (i) if water is the quenching solvent, making at least one phase cut, and (ii)

if a quenching solvent other than water is used, adding wash water and making a phase cut; and C) separating and recovering TMEDA and unreacted CTA from the reaction mixture, whereby water is also removed from the reaction mixture, and continuing the separation such that the CTA content of the resultant product mixture is less than 0.1 wt %.

A feature of the process for preparing the branched or star-branched styrene polymeric, telomeric, and monomeric product distributions of this invention is the extent to which the reagents in the reaction mixture are uniformly dispersed. Thus, the combination of significant agitation and dispersive mixing of the reagents in the reaction mixture is utilized in order to provide the product distributions of this invention. More specifically, the agitation and mixing used should be at least sufficient to maintain a substantially homogeneous concentration profile in the reaction mixture. That is to say, that concentration gradients of all reagents in the total volume of the reaction mixture should be at a minimum such that there is no one discrete reaction zone (i.e., locally high concentrations of any such reagent are at a minimum). As a consequence of this, the complementary reaction kinetics of chain transfer and chain propagation occur uniformly throughout the entire volume of the reaction mixture, thereby providing the uniform molecular weight distributions achieved in the practice of the processes of this invention. In doing so, competing undesirable side reactions which would lead to catalyst inefficiencies and formation of impurities are essentially eliminated.

In conducting Step A) of the above process, various alkyllithium catalysts can be employed, either singly or in mixtures of two or more alkyllithium or cycloalkyllithium species. Preferably, the alkyllithium reagents contain in the range of 1 to about 5 carbon atoms in the molecule and the cycloalkyllithium reagents contain in the range of about 5 to about 7 carbon atoms in the molecule. More preferred are organolithium compounds which are available as articles of commerce. Particularly preferred are n-butyllithium and sec-butyllithium, especially when used individually rather than in combination. In addition, organolithium compounds other than alkyllithium compounds can be used. Non-limiting examples of such other organolithium compounds include phenyllithium, xylyllithium, mesityllithium, 1-phenylhexyllithium and polystyryl-based lithium compounds which can be preformed or generated in situ.

In conducting Step A) of the above process, a polyaliphatic tertiary amine promoter or activator capable of complexing with the alkyllithium and the range of reactive intermediates formed from the alkyllithium is used. The material of choice is TMEDA. However, other analogous tertiary amines can be used, if desired. For example, experimental results have shown that N,N,N',N',N"-pentamethyldiethylenetriamine (PMDTA) can be successfully employed in the process of this invention. TMEDA remains the presently most preferred such tertiary amine component for use in the processes of this invention because of its high activity and its convenience in recycle due to its volatility.

The CTA used in the processes of this invention is an aromatic hydrocarbon which can be (i) xylene (which can be any one or mixture of o-, m-, and/or p-isomers), (ii) one or a mixture of trimethylbenzenes, including for example, mesitylene, 1,2,3-trimethylbenzene, 1,2,4-trimethylbenzene, 1,2,5-trimethylbenzyl, or mixtures thereof, (iii) one or a mixture of tetramethylbenzenes, such as durene, 1,2,3,4-tetramethylbenzene, 1,2,3,5-tetramethylbenzene, or other isomers thereof, and (iv) mixtures of any two or more of (i), (ii), and (iii). The CTA should be free or substantially free of any alkylbenzene species in which the alkyl group is other than methyl, and also free of any aromatic hydrocarbon having 2 or more aromatic rings. It should also be free or substantially free of tetrahydronaphthalene. By "substantially free" is meant that if any such designated material is present, the amount thereof is not more than 1 wt %, based on the total weight of the aromatic hydrocarbon.

In conducting Step A), the CTA alkyllithium catalyst and TMEDA can be brought together in any suitable sequence and/or subcombination(s). Typically, the styrene is fed to a preformed mixture of the other components. However, co-feeding techniques can be used if desired.

In conducting Step B) of the process, upon completion of the styrene addition reaction, as indicated, for example, by rapid reduction in the process temperature at constant heat flux, the reaction mixture is quenched, typically at a temperature just below the reaction temperature used, with the proviso that if the reaction is performed at a temperature above 95° C., the temperature used for the quenching should be below about 95° C. The quenching is effected using a protic solvent which, (i) if water is the quenching solvent, at least one phase cut is made to separate the organic and aqueous phases, and (ii) if a quenching solvent other than water is used, wash water is added to extract the quenching solvent and form an organic phase and an aqueous phase which are then separated by a phase cut.

In conducting Step C) above, the TMEDA and unreacted CTA are separated and recovered from the reaction mixture, whereby the last traces of water are also removed azeotropically from the reaction mixture. This separation operation is continued in a suitable vessel in a batch or continuous strip operation or can be conducted by other means, such as in a wiped film evaporator (WFE), until the CTA content of the resultant product mixture is less than 0.1 wt %. In some cases, such as complying with product specifications, it is desirable to distill the lowest molecular weight components of the reaction mixture. This is conveniently conducted using a WFE. Preferably, the TMEDA-CTA mixture is recovered and recycled to the reaction after drying by conventional means, which include passing through molecular sieves or by refluxing under a sparge of dry nitrogen, or any other method which preferably does not remove the TMEDA from the CTA. If the method happens to remove the TMEDA, it is desirable from a process economics standpoint to recover and recycle the TMEDA as well as the CTA. In the quenching operation and washings thereafter, use of deoxygenated water is especially desirable because it suppresses formation of color bodies in the distribution of styrene polymers. Formation of such color bodies is very undesirable in as much as the amount of such color bodies can continuously increase as the commercial production unit reaches steady-state production. A commercial plant facility can be operated either on a batch, semi-batch, or continuous mode using balanced feeds as described above.

In conducting Step C) with the desire to obtain formulations having a substantially reduced level of the lowest molecular styrene addition product, the mono-adducts, it is advantageous to recover and recycle the distribution of mono-adducts. This is typically done by further stripping and is conveniently conducted using a WFE. The recovered distribution of mono-adducts can be combined with the dried recovered CTA and/or dried TMEDA and recycled in the process in Step A) above. This mode of operation is particularly desirable when producing branched styrene telomer distributions and styrene adduct distributions substantially enriched in styrene addition products wherein 2-styrene units have been added. Such distributions are represented by formulas III and IV.

Examples 1 and 2 demonstrate methods for making higher molecular weight branched and star branched styrene polymers. In the Examples, the term "BSPD" designates a branched styrene polymer distribution, "SBSPD" designates a stripped branched styrene polymer distribution (the stripping is conducted to remove CTA and other volatile fractions), "BSTD" designates a branched styrene telomer distribution, and "SBSTD" designates a stripped branched styrene telomer distribution (the stripping is conducted to remove CTA and other volatile fractions. The numeral following such designations of a given product distribution identifies the Example number describing how the product distribution was prepared.

Example 1

Preparation of BSPD-1

A dry oil-jacketed 3-liter resin kettle reactor equipped with stainless steel internal cooling coils (chilled water) and a glass overhead stiffing mechanism (no polytetrafluoroethylene (PTFE) wetted parts) was charged with 139 g, (161 mL, 1.16 mol) of anhydrous mesitylene and heated to 115° C. To the mixture was charged butyl lithium (0.0922 mol) in cyclohexane followed by 10.98 g (0.095 mol) dry TMEDA. Styrene (1200 g, 11.52 mol) dissolved in 650 ml of pentane was fed to the reactor (through a plug of anhydrous basic alumina) in 180 minutes at 115° C. Pentane was distilled overhead through out the feed as it flashed to disperse the styrene. As the reaction mixture thickened additional mesitylene was charged to keep the mixture fluid, a total of 410 g charges (0.33 mol) was made. The reaction mixture was cooled to 95° C. quenched with 100 mL of water and subsequently washed three times with 1.0 kg of tap water. Mesitylene was distilled from the crude star branched polymer. The crude material was then distilled at full vacuum to yield 1400 g of a clear colorless resin having the following GPC analysis: $M_n$: 755, $M_w$: 1178, $M_z$: 2157, PD: 1.1559.

Example 2

Preparation of BSPD-2

A dry oil-jacketed 3-liter resin kettle reactor equipped with stainless steel internal cooling coils (chilled water) and a glass overhead stirring mechanism (no PTFE wetted parts) was charged with 492 g, (569 mL, 4.63 mol) of anhydrous m-xylene and heated to 105° C. To the mixture was charged butyl lithium (0.0348 mol) in cyclohexane followed by 4.04 g (0.0348 mol) dry TMEDA. Styrene (804.1 g, 7.72 mol) dissolved in 650 ml of pentane was fed to the reactor (through a plug of anhydrous basic alumina) in 180 minutes at 105° C. to 115° C. Pentane was distilled overhead through out the feed as it flashed to disperse the styrene. The reaction mixture was cooled to 80° C. quenched with 100 mL of water and 1 liter of cyclohexane. The crude reaction mixture was washed three times with 1.0 kg of tap water. m-Xylene and cyclohexane were distilled from the star branched polymer. GPC Analysis of the stripped mixture was as follows: $M_n$: 444, $M_w$: 812, $M_z$: 1437, PD: 1.829. The crude material was then distilled at full vacuum and to a pot temperature of 220° C. to yield 800 g of a clear colorless resin having the following GPC analysis: $M_n$: 732, $M_w$: 1022, $M_z$: 1515, PD: 1.396.

Examples 3 through 5 demonstrate methods for making lower molecular weight branched and star branched styrene polymers.

General Description

A spherical glass 12 liter creased reactor with oil jacket was equipped with a reflux condenser, distillation head, submerged thermal couple, bottom drain valve, and stainless steel internal cooling coils. Temperature was tightly maintained at a set point via PID controller that regulates water flow to the cooling coils. Vigorous agitation was accomplished by means of an overhead stiffing assembly comprised of 19 mm OD glass shaft with two sets of glass impellers, one set pitched and the other flat, fused to the shaft. The reactor is essentially free of all wetted PTFE parts or other polymeric fluorinated materials or elastomers.

The reactor was maintained under an inert dry $N_2$ atmosphere during all operations. The reactor was charged with the chain transfer agent(s) through a dip leg by means of a diaphragm pump. Alkyl lithium, additional solvents and the amine promoter (TMEDA) were all fed subsurface to the stirred chain transfer agent(s) through the same dip leg. Styrene was pumped into the reactor by means of a metering pump through a 3" cylindrical column (1.75" dia.≈100 g) of Basic Aluminum Oxide (EMD Chemicals, Aluminum oxide 90, mesh 70-230, column chromatography grade) and delivered as a fine stream or spray above the surface of the reaction mixture through two 1/16" OD feed nozzles.

Example 3—PART A

Preparation of BSPD-3

Mesitylene 1305 g, (≈1.5 liters, 10.86 mol) was charged to the reactor previously heated to reflux and azeotropically dried over a 4 hour period. The dried mesitylene was heated to 115° C. with the oil jacket and PID controller operating the cooling coils both set at that temperature. Upon heating to the set point temperature, 154.4 g n-BuLi solution (2M in cyclohexane, 0.398 mol) was charged through the dip leg below the surface of the gently agitated (300 rpm) mesitylene reaction mixture. The feed line was then flushed with 75 ml of anhydrous mesitylene. Next, 49.4 g of TMEDA (0.425 mol) was charged to the reactor through the subsurface feed line forming the characteristic bright red color of TMEDA complexed mesityl lithium anion with concomitant off gassing of butane. The subsurface line was flushed with a second 75 ml aliquot of anhydrous mesitylene via metering pump. Additionally 350 ml of anhydrous mesitylene was fed at a constant rate during the anionic chain transfer polymerization process. Reactor agitation was increased to 510 rpm and 5256 g of styrene (99+%, 50.46 mol) was fed over 160 minutes. The well-calibrated metering pump was programmed to feed at an average rate of 32.85 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the cooling coils.

The set point of PID temperature controller was maintained at 115° C. and water was fed through the cooling coils as needed while the flow of the hot oil was altered to bypass the reactor jacket. The reaction mixture was quenched at 80° C. with a 50 ml aliquot of deoxygenated water resulting in a water white turbid mixture. 3 liters of cyclohexane was added to assist with the phase cuts. The reaction mixture was washed with deoxygenated water (3×1500 ml). Phase cuts were rapid and required little settling time. Water and any rag or emulsion was removed through the bottom drain valve.

The temperature of the oil jacket was increased to 130° C. while the control valve to the cooling coils turned off. Cyclohexane, residual moisture and mesitylene were distilled through a simple distillation head (1 atm.) until a pot temperature of 115° C. was observed. An aliquot was removed for analysis via GPC of the product mixture excluding mesitylene was as follows $M_n$: 488, $M_w$: 566, $M_z$: 647, PD: 1.16, $M_w$ 10% Low: 263, $M_w$ 10% High: 999.

Example 3—PART B

Forming SBSPD-3b

A 1899 g sample of the crude reaction mixture from Example 3—Part A, was stripped via continuous operation of excess mesitylene to yield 1315 g of an intermediate product stream that had the following GPC analysis: $M_n$: 547, $M_w$: 605, $M_z$: 672, PD: 1.11, $M_w$ 10% Low: 331, $M_w$ 10% High: 1022. The continuous strip was accomplished by means of a wiped film evaporator (WFE). WFE operating conditions were as follows: feed rate=1.33 L/hr, oil jacket temperature=220° C., Pressure=<0.1 mmHg and condenser temperature=0° C. Additionally 548 g of mesitylene was collected in a dry ice trap, while the cold finger condensed 129 g of a mixture of mesitylene and 1-(3,5-dimethylphenyl)-3-phenylpropane.

Example 3—PART C

Forming SBSPD-3c

A 4264 g sample of the crude reaction mixture from Example 3—Part A, was stripped via continuous operation of excess mesitylene to yield 4106 g of an intermediate product stream that had the following GPC analysis: $M_n$: 493, $M_w$: 580, $M_z$: 685, PD: 1.18, $M_w$ 10% Low: 271, $M_w$ 10% High: 1107. The continuous strip was accomplished by means of wiped film evaporator (WFE, aka. Pope Still). WFE operating conditions were as follows: feed rate=1.33 L/hr, oil jacket temperature=185° C., Pressure=20 mmHg and condenser temperature=0° C. Additionally 59 g of mesitylene was collected in a dry ice trap, while the cold finger condensed 99 g of a mixture of mesitylene and 1-(3,5-dimethylphenyl)-3-phenylpropane.

Example 4—PART A

Preparation of BSPD-4

The procedure of Example 3, Part A was repeated except that o-xylene 1760 g, (2 liters, 16.58 mol), with 128.4 g n-BuLi solution (2M in cyclohexane, 0.331 mol) and 38.6 g of TMEDA (0.332 mol) were charged to the reactor. Additionally 300 mL of anhydrous o-xylene was fed at a constant rate during the anionic chain transfer polymerization process. Styrene, 5176 g (99+%, 49.7 mol) dissolved with 657 g of pentane was fed over 180 minutes.

After water washing, cyclohexane, residual moisture and o-xylene were distilled via simple distillation head (1 atm.) until a pot temperature of 115° C. was observed. An aliquot was removed for analysis via GPC of the product mixture excluding o-xylene was as follows: $M_n$: 287, $M_w$: 338, $M_z$: 409, PD: 1.18, $M_w$ 10% Low: 175, $M_w$ 10% High: 683.

The crude reaction mixture, 3598 g (this is roughly half the material, 7857 total), was stirred with 60 g of $Na_2SO_4$ for one hour. This was then filtered through a pad of $Na_2SO_4$ followed by filtering through silica gel to improve color.

Example 4—PART B

Forming SBSPD-4b

The 3598 g sample of the crude silica gel treated reaction mixture from Example 4, Part A was then stripped via continuous operation of excess o-xylene to yield 3293 g of an intermediate product stream that had the following GPC analysis: $M_n$: 275, $M_w$: 322, $M_z$: 387, PD: 1.17, $M_w$ 10% Low: 166, $M_w$ 10% High: 638. The continuous strip was accomplished by means of wiped film evaporator (WFE). WFE operating conditions were as follows: feed rate=1.33 L/hr, oil jacket temperature=130° C., Pressure=30 mmHg and condenser temperature=0° C. Additionally the cold finger condensed 296 g of a mixture of o-xylene and 1-(2-methylphenyl)-3-phenylpropane.

Example 4 PART C

Forming SBSPD-4c

A 4259 g sample of the crude reaction mixture (not treated with silica gel) from Example 4, Part A was stripped via continuous operation of excess o-xylene to yield 3617 g of an intermediate product stream that had the following GPC analysis: $M_n$: 288, $M_w$: 337, $M_z$: 405, PD: 1.17. The continuous strip was accomplished by means of wiped film evaporator (WFE, aka. Pope Still). WFE operating conditions were as follows: feed rate=1.33 L/hr, oil jacket temperature=130° C., Pressure=30 mm Hg and condenser temperature=0° C. Additionally the cold finger condensed 620 g of a mixture of o-xylene and 1-(2-methylphenyl)-3-phenylpropane.

A second pass of the concentrate through the WFE produced 2874 g of an oligomeric mixture with the following GPC profile: $M_n$: 291, $M_w$: 343, $M_z$: 422, PD: 1.18, $M_w$ 10% Low: 196, $M_w$ 10% High: 710. WFE operating conditions were as follows: feed rate=1.33 L/hr, oil jacket temperature=220° C., Pressure=10 mmHg and condenser temperature=0° C. A mixture (713 g) of 1-(2-methylphenyl)-3-phenylpropane and its structural isomers (dimethylated diphenylethanes) were collected as a distillate.

Example 5—PART A

Preparation of BSPD-5

The procedure of Example 3, Part A was repeated except that p-xylene 1459 g, (≈1.7 liters, 13.74 mol), with 107.1 g n-BuLi solution (2M in cyclohexane, 0.276 mol)) and 32.8 g of TMEDA (0.332 mol) was charged to the reactor. Additionally 300 ml of anhydrous p-xylene was fed at a constant rate during the anionic chain transfer polymerization process. Styrene (3452 g; 99+%, 33.14 mol) was fed over 150 minutes.

After water washing, cyclohexane, residual moisture and o-xylene were distilled via simple distillation head (1 atm.) until a pot temperature of 115° C. was observed. An aliquot was removed for analysis via GPC of the product mixture excluding o-xylene was as follows: $M_n$: 320, $M_w$: 439, $M_z$: 663, PD: 1.37, $M_w$ 10% Low: 168, $M_w$ 10% High: 1159.

Example 5—PART B

Forming SBSPD-5b

A 1824 g sample of the crude reaction mixture from Example 5, Part A was stripped via continuous operation of excess p-xylene to yield 1624 g of an intermediate product stream that had the following GPC analysis: $M_n$: 381, $M_w$: 495, $M_z$: 653, PD: 1.30, $M_w$ 10% Low: 195, $M_w$ 10% High: 1118. The continuous strip was accomplished by means of wiped film evaporator (WFE, a.k.a. Pope Still). WFE operating conditions were as follows: feed rate=1.33 L/hr, oil jacket temperature=165° C., Pressure=10 mmHg and condenser temperature=0° C. Additionally 38 g of p-xylene was collected in a dry ice trap, while the cold finger condensed 123 g of a mixture of p-xylene and 1-(4-methylphenyl)-3-phenylpropane.

Example 5—PART C

Forming SBSPD-5c

A 3257 g sample of the crude reaction mixture from Example 5, Part A was stripped via continuous operation of excess p-xylene to yield 2670.2 g of an intermediate product stream that had the following GPC analysis: $M_n$: 343, $M_w$: 457, $M_z$: 665, PD: 1.33, $M_w$ 10% Low: 170, $M_w$ 10% High: 1154. The continuous strip was accomplished by means of a wiped film evaporator (WFE). WFE operating conditions were as follows: feed rate=1.33 L/hr, oil jacket temperature=200° C., Pressure=9 mmHg and condenser temperature=0° C. Additionally 164 g of p-xylene was collected in a dry ice trap, while the cold finger condensed 397 g of a mixture of p-xylene and 1-(4-methylphenyl)-3-phenylpropane.

Examples 6 through 14 demonstrate methods for making branched styrene telomer distributions using o-xylenes as the CTA. Examples 12-14 further demonstrate use of 1-(2-methylphenyl)-3-phenylpropane as a recycle from prior reactions.

Example 6

Forming BSTD-6

A dry 500-ml 4-necked, oil-jacketed glass flask was equipped with a thermal couple, glass overhead stirrer with glass paddle, condenser and $N_2$ inlet. The reactor was charged with 121 ml (106.2 g, 1.0 mol) o-xylene and then subsequently with 4.0 ml (0.008 mol) 2 M n-butyl lithium and 1.14 ml (0.88 g, 0.0076 mol) of TMEDA at ambient temperature. The temperature of the reaction mixture was increased to 115° C. Styrene (115 ml, 104.2 g, 1.0 mol) was pumped into the reactor over 207 minutes at a constant rate while maintaining constant and significant agitation of the mixture. Upon completion of the styrene feed, 4.2 ml o-xylene was pumped into the reaction mixture to replace styrene in the feed. The reaction mixture was held at 115° C. for 30 min and then cooled to 80° C. to quench with 0.5 ml isopropyl alcohol. After cooling to room temperature and settling of the lithium isopropoxide salts, the solution was sampled for GPC analysis, the results excluding o-xylene are summarized in Table 1 and for comparison with Examples 12-14 again in Table 2.

Example 7

Forming BSTD-7

The procedure of Example 6 was repeated except that 129 ml (117.2 g, 1.13 mol) of styrene was fed over a 168 minute period to a reaction mass formed from 109 ml (95.5 g, 0.9 mol) o-xylene, 4.5 ml (0.009 mol) 2 M n-butyl lithium and 1.28 ml (0.99 g, 0.0086 mol) of TMEDA. GPC analysis for the reaction mass excluding o-xylene is summarized in Table 1.

Example 8

Forming BSTD-8

The procedure of Example 6 was repeated except that 129 mL (117.2 g, 1.13 mol) of styrene was fed over a 125 minute period to a reaction mass formed from 109 ml (95.5 g, 0.9 mol) o-xylene, 4.5 ml (0.009 mol) 2 M n-butyl lithium and 1.28 ml (0.99 g, 0.0086 mol) of TMEDA. GPC analysis for the reaction mass excluding o-xylene is summarized in Table 1.

Example 9

Forming BSTD-9

The procedure of Example 6 was repeated except that 141 ml (128.4 g, 1.23 mol) of styrene was fed over a 193 minute period at 120° C. to a reaction mass formed from 85 ml (74.8 g, 0.7 mol) o-xylene, 4.1 ml (0.0082 mol) 2 M n-butyl lithium and 1.17 ml (0.91 g, 0.0078 mol) of TMEDA. GPC analysis for the reaction mass excluding o-xylene is summarized in Table 1.

Example 10

Forming BSTD-10

The procedure of Example 6 was repeated except that 141 ml (128.4 g, 1.23 mol) of styrene was fed over a 184 minute period at 110° C. to a reaction mass formed from 85 ml (74.8 g, 0.7 mol) o-xylene, 4.1 ml (0.0082 mol) 2 M n-butyl lithium and 1.17 ml (0.91 g, 0.0078 mol) of TMEDA. GPC analysis for the reaction mass excluding o-xylene is summarized in Table 1.

Example 11

Forming BSTD-11

The procedure of Example 6 was repeated except that 141 ml (128.4 g, 1.23 mol) of styrene was fed over a 190 minute period at 110° C. to a reaction mass formed from 85 ml (74.8 g, 0.7 mol) o-xylene, 4.9 ml (0.0099 mol) 2 M n-butyl lithium and 1.41 ml (1.09 g, 0.0094 mol) of TMEDA. GPC analysis for the reaction mass excluding o-xylene is summarized in Table 1.

Example 12

Forming BSTD-12 Demonstrating Recycle of 1-(2-methylphenyl)-3-phenylpropane

The procedure of Example 6 was repeated except that 61 ml (55.4 g, 0.053 mol) of styrene dissolved in 36.2 mL o-xylene (31.9 g, 0.3 mol) was fed over a 208 minute period at about 115° C. to a reaction mass formed from 84.1 g 1-(2-methylphenyl)-3-phenylpropane (0.40 mol), 12.1 mL (10.6 g, 0.1 mol) o-xylene, 3.3 mL (0.0067 mol) n-butyl lithium (2 M in cyclohexane) and 1.0 mL (0.77 g, 0.0067 mol) TMEDA. GPC analysis for the reaction mass excluding o-xylene is summarized in Table 2.

Example 13

Forming BSTD-13 Demonstrating Recycle of 1-(2-methylphenyl)-3-phenylpropane

The procedure of Example 6 was repeated except that 61 ml (55.4 g, 0.053 mol) of styrene dissolved in 36.2 mL o-xylene (31.9 g, 0.3 mol) was fed over a 207 minute period at about 115° C. to a reaction mass formed from 84.1 g 1-(2-methylphenyl)-3-phenylpropane (0.40 mol), 12.1 mL (10.6 g, 0.1 mol) o-xylene, 2.2 mL (0.0044 mol) n-butyl lithium (2 M in cyclohexane) and 0.66 mL (0.52 g, 0.0044 mol) TMEDA. GPC analysis for the reaction mass excluding o-xylene is summarized in Table 2.

Example 14

Forming BSTD-13 Demonstrating Recycle of 1-(2-methylphenyl)-3-phenylpropane

The procedure of Example 6 was repeated except that 76.5 ml (69.6 g, 0.67 mol) of styrene dissolved in 36.2 mL o-xylene (31.9 g, 0.3 mol) was fed over a 242 minute period at about 115° C. to a reaction mass formed from 84.1 g 1-(2-methylphenyl)-3-phenylpropane (0.40 mol), 12.1 mL (10.6 g, 0.1 mol) o-xylene, 2.8 mL (0.0056 mol) n-butyl lithium (2 M in cyclohexane) and 0.83 mL (0.52 g, 0.0056 mol) TMEDA. GPC analysis for the reaction mass excluding o-xylene is summarized in Table 2.

Examples 15 through 18 demonstrate methods for making the lowest molecular weight branched styrene polymer distributions using o-xylenes as the CTA.

Example 15

Forming BSPD-15

The procedure of Example 6 was repeated except that 114 ml (104.2 g, 1.0 mol) of styrene was fed over a 150 minute period to a reaction mass formed from 121 ml (106.2 g, 1.0 mol) o-xylene, 4.0 ml (0.008 mol) 2 M n-butyl lithium and 1.14 ml (0.88 g, 0.0076 mol) of TMEDA. GPC analysis for the reaction mass excluding o-xylene is summarized in Table 3.

Example 16

Forming BSPD-16

The procedure of Example 6 was repeated except that 141 ml (128.4 g, 1.23 mol) of styrene was fed over a 135 minute period to a reaction mass formed from 85 ml (74.8 g, 0.70 mol) o-xylene, 4.1 ml (0.0082 mol) 2 M n-butyl lithium and 1.17 ml (0.91 g, 0.0078 mol) of TMEDA. GPC analysis for the reaction mass excluding o-xylene is summarized in Table 3.

Example 17

Forming BSPD-17

The procedure of Example 6 was repeated except that 148 ml (134.9 g, 1.30 mol) of styrene was fed over a 196 minute period to a reaction mass formed from 84.5 ml (74.3 g, 0.7 mol) o-xylene, 4.3 ml (0.0086 mol) 2 M n-butyl lithium and 1.23 ml (0.95 g, 0.0082 mol) of TMEDA. GPC analysis for the reaction mass excluding o-xylene is summarized in Table 3.

Example 18

Forming BSPD-18

The procedure of Example 6 was repeated except that 141 ml (128.4 g, 1.23 mol) of styrene was fed over a 74 minute period to a reaction mass formed from 85 ml (74.8 g, 0.70 mol) o-xylene, 4.2 ml (0.0082 mol) 2 M n-butyl lithium and 1.17 ml (0.91 g, 0.0078 mol) of TMEDA. GPC analysis for the reaction mass excluding o-xylene is summarized in Table 3.

TABLE 1

| BSTD | 6 | 7 | 8 | 9 | 10 | 11 |
|---|---|---|---|---|---|---|
| Volume styrene | 114 | 129 | 129 | 141 | 141 | 141 |
| Styrene (mol) | 1 | 1.13 | 1.13 | 1.23 | 1.23 | 1.23 |
| o-Xylene (mol) | 1 | 0.9 | 0.9 | 0.7 | 0.7 | 0.7 |
| BuLi (mol) | 0.008 | 0.0090 | 0.0090 | 0.008 | 0.008 | 0.0099 |
| TMEDA (mol) | 0.008 | 0.0086 | 0.009 | 0.008 | 0.008 | 0.0094 |
| Feed time (hr) | 3.45 | 2.79 | 2.08 | 3.22 | 3.05 | 3.18 |
| Feed rate (ml/min) | 0.56 | 0.77 | 0.1.03 | 0.73 | 0.77 | 0.74 |
| Mole Styrene/Mole o-xylene/hour | 0.29 | 0.45 | 0.60 | 0.55 | 0.77 | 0.55 |
| Mole Styrene/Mole Bu—Li/hour | 36 | 45 | 60 | 48 | 50 | 39 |
| Temp (° C.) | 115 | 115 | 115 | 120 | 110 | 110 |
| GPC Data | | | | | | |
| $M_n$ | 263 | 282 | 291 | 306 | 315 | 322 |
| $M_w$ | 290 | 318 | 335 | 359 | 361 | 369 |
| $M_z$ | 328 | 368 | 395 | 438 | 420 | 428 |
| PD | 1.103 | 1.128 | 1.15 | 1.173 | 1.146 | 1.146 |
| Number average DP | 0.51 | 0.69 | 0.78 | 0.92 | 1.01 | 1.08 |
| GPC area % with an $M_w > 620$ Daltons | 2 | 4.10 | 6.90 | 8.80 | 8.20 | 7.90 |

TABLE 2

| BSTD | 6 | 12 | 13 | 14 |
|---|---|---|---|---|
| Volume styrene | 114 | 61 | 61 | 77 |
| Styrene (mol) | 1.0 | 0.532 | 0.532 | 0.670 |
| o-Xylene (total mol) | 1.0 | 0.400 | 0.400 | 0.400 |
| 1-(2-methylphenyl)-3-phenylpropane (mol) | 0.000 | 0.400 | 0.400 | 0.400 |
| BuLi (mol) | 0.008 | 0.007 | 0.004 | 0.006 |
| TMEDA (mol) | 0.008 | 0.007 | 0.004 | 0.006 |
| Feed time (hr) | 3.45 | 3.46 | 3.45 | 4.03 |
| Feed rate (ml/min) | 0.56 | 0.470 | 0.470 | 0.460 |
| Mole Styrene/Mole o-xylene/hour | 0.29 | 0.38 | 0.39 | 0.42 |
| Mole Styrene/Mole Bu—Li/hour | 36 | 36 | 39 | 28 |
| Temp (° C.) | 115 | 115-116 | 115-116 | 115-116 |
| GPC DATA | | | | |
| $M_n$ | | 263 | 266 | 294 | 313 |
| $M_w$ | | 290 | 310 | 328 | 356 |
| $M_z$ | | 328 | 354 | 374 | 416 |
| PD | | 1.103 | 1.165 | 1.116 | 1.137 |
| Number average DP | | 0.51 | 0.54 | 0.81 | 0.99 |
| GPC area % with an $M_w$ > 620 Daltons | | 2.00 | 3.10 | 3.10 | 5.90 |

TABLE 3

| BSPD | 15 | 16 | 17 | 18 |
|---|---|---|---|---|
| Volume styrene | 114 | 141 | 149 | 141 |
| Styrene (mol) | 1 | 1.23 | 1.3 | 1.23 |
| o-Xylene (mol) | 1 | 0.7 | 0.7 | 0.7 |
| BuLi (mol) | 0.008 | 0.0082 | 0.009 | 0.0082 |
| TMEDA (mol) | 0.008 | 0.0078 | 0.008 | 0.0078 |
| feed time (hr) | 2.47 | 2.26 | 3.31 | 1.22 |
| Feed rate (ml/min) | 0.77 | 1.04 | 0.75 | 1.92 |
| Mole Styrene/Mole o-xylene/hour | 0.41 | 0.78 | 0.56 | 1.44 |
| Mole Styrene/Mole Bu—Li/hour | 51 | 66 | 44 | 123 |
| Temp (° C.) | 115 | 115 | 115 | 115 |
| GPC DATA | | | | |
| $M_n$ | 303 | 316 | 321 | 366 |
| $M_w$ | 368 | 370 | 384 | 484 |
| $M_z$ | 477 | 438 | 486 | 674 |
| PD | 1.215 | 1.171 | 1.196 | 1.322 |
| Number average DP | 0.89 | 1.02 | 1.07 | 1.50 |
| GPC area % with an $M_w$ > 620 Daltons | 11.90 | 12.70 | 12.90 | 28.00 |

Preferred Bromination Technology for Use in the Practice of this Invention

The preferred processes of this invention comprise brominating the product distributions of this invention with a brominating agent and in the presence of a catalytic amount of an aluminum halide catalyst when the desired bromine levels in the brominated products of this invention are in excess of 68% bromine. When a bromine level below 68% bromine in the brominated products of this invention is sought, then a milder Lewis acid catalyst (e.g., an iron trihalide; antimony halide; or other weak Lewis acid metal halide, where the halogen atoms can be chlorine, bromine and/or iodine) is used.

To form products having bromine contents in the range of about 68% to about 79% bromine it is desired that the initial form of the aluminum halide catalyst used in the processes of this invention is as $AlCl_3$ or $AlBr_3$. The $AlCl_3$ is desirably slurried in a suitable diluent. Alternatively, $AlCl_3$ can be reacted by means of chloride bromide exchange (trans-halogenation) to produce a mixed or partially mixed chlorobromo aluminum trihalide with improved solubility in the liquid diluent. When $AlBr_3$ is used, it is desirable to predissolve it in bromine. The bromination processes of this invention can be conducted as a batch, semi-batch or as a continuous process.

As noted previously, preferred processes of this invention can be additionally characterized as having the distributions of this invention fed to a reactor as a solute in proximity to and contemporaneously with joint or separate feed(s) to the reactor of the brominating agent and the $AlBr_3$, such feeds being subsurface the liquid contents of the reactor (usually a liquid solvent heel at feed initiation and the crude reaction mass after feeding has been initiated) and such feeds forming, with the initial reactor contents, a crude reaction mass at least comprising brominated product distributions of this invention, $AlBr_3$, and solvent. The crude reaction mass can also contain unreacted brominating agent. Another class of impurity that will likely be present in all cases is N-bromoamines, which are suspected to give rise to undesirable color bodies and thermally labile bromine. These N-bromoamines would form from amine components or impurities suspected to be present in the product distributions of this invention. They are suspected to be derived from the chain transfer polymerization promoter, TMEDA.

The solvent chosen for the feed of the product distributions of this invention is preferably the same as the solvent that is pre-charged to the reactor before feeding begins.

The solvent used in the bromination of the product distributions of this invention and reactor pre-charges can be selected from any of the following exemplary solvents; dichloromethane, dibromomethane, bromochloromethane, bromotrichloromethane, chloroform, 1,2-dibromoethane, 1,1-dibromoethane, 1-bromo-2-chloroethane, 1,2-dichloroethane, 1,1,2-tribromoethane, 1,1,2,2-tetrabromoethane, 1,2-dibromopropane, 1-bromo-3-chloropropane, 1-bromobutane, 2-bromobutane, 2-bromo-2-methylpropane, 1-bromopentane, 1,5-dibromopentane, 1-bromo-2-methylbutane, 1-bromohexane, 1-bromoheptane, bromocyclohexane, and liquid isomers, homologs, or analogs thereof and mixtures of any two or more of the foregoing. Preferred solvents are dichloromethane, dibromomethane, and 1,2-dichloroethane. Bromochloromethane is a particularly preferred solvent for bromination of the branched and/or star branched styrene polymer distributions of this invention.

Whatever the solvent chosen is, it is important to ensure that it is relatively free of water. Water in the reaction system during bromination will affect catalytic activity of the aluminum halide catalyst as is well recognized in the art. Generally, it is best that the solvent contain less than about 50 ppm (weight/weight) water. In regard to water, all reactants should be dry. The brominating agent, e.g. bromine, should not contain more than about 30 ppm water. The styrene polymer distributions of this invention should also be sufficiently dry so as to not introduce deleterious amounts of water into the bromination.

The amount of solvent in the feed of the product distributions of this invention is that amount which at least enables the formation of a free-flowing, low-viscosity solutions. In cases where the product distributions of this invention is liquid, consideration for using a solvent-free feed of the styrene polymer distributions of this invention can be given. However, it has been found that the use of a solvent is preferred as it helps dilute the feed of the product distributions of this invention so that efficient bromination can occur in the reaction mass. Generally, when the solvent is bromochloromethane, from about 60 to about 80 wt % of the feed of the styrene polymer distributions of this invention will be solvent. Preferred amounts of solvent are from about 65 to about 75 wt %. It has been shown to be advantageous to treat the solution of the styrene polymer distribution of this invention in the brominating solvent with a solid absorbent that does not introduce or catalyze the formation of unacceptable amounts of impurities, such as acidic aluminum oxide to remove polar species prior to bromination. Such treatment results in enhanced thermal HBr stability. Other suitable absorbants that do not introduce or catalyze formation of an unacceptable amount of impurities are available in the marketplace. Such materials as the acidic forms of Amberlyst® or Amberlyte® resins (Rohm & Haas Company), the acidic forms of Dowex® resins (The Dow Chemical Company), or the like are deemed suitable for use as absorbants for use in this treatment procedure. High surface silica gel, neutral and basic forms of aluminum oxide, and certain acidic zeolites are also deemed suitable for use in this treatment procedure.

The pre-charge of solvent to the reactor prior to the reactant and catalysts feeds is that amount which will provide a sufficient mass to provide an adequate heat sink to disperse the heat of the bromination reaction combined with the heat of solution of the by-product HBr so that a "heat kick" or temperature spike is minimized in the proximity of the above mentioned feeds. To this end, it is also preferred that the crude reactor contents/crude reaction mass be stirred to promote thermal and mass uniformity therein. Use of a heel from a previous run already saturated with HBr reduces the initial demand on the cooling system of the reactor and for that reason is preferred in some commercial configurations.

The $AlBr_3$ can be fed as a solute in, for example bromine, separate from the brominating agent feed, however, such a separated feeding scheme is not preferred. Process simplicity, dictates that the brominating agent be bromine and that the $AlBr_3$ and the bromine be fed as a single feed. $AlBr_3$ readily dissolves in bromine. The amount of $AlBr_3$ fed, whether separately or in combination with the bromine feed, is a catalytic amount sufficient to provide from about 0.3 to about 1 mole % $AlBr_3$ per mole of bromine fed as calculated using the equation:

$$\text{Mole \% } AlBr_3 = (\text{weight of } AlBr_3/266.7 \div \text{weight of Bromine}/159.81) \times 100.$$

The amount of bromine fed is that amount required to achieve the desired bromination level sought assuming some small loss of bromine overhead with by-product HBr. When brominating the product distributions of this invention, one can simply charge bromine based on the weight of the substrate to be brominated according to the equations below:

$$\text{wt Br} = \text{wt \% Br} \cdot \text{wt Substrate}_{brominated} \qquad a)$$

$$\text{wt Substrate}_{brominated} \approx \text{wt Substrate}_{unbrominated}/(1-\text{wt \% Br}) \qquad b)$$

Note: In b), the approximation is the result of ignoring the small amount of mass not accounted for the protons substituted by bromine.

Thus, $$\text{wt Br} \approx \text{wt \% Br} \cdot [\text{wt Substrate}_{unbrominated}/(1-\text{wt \% Br})] \qquad c)$$

and $$\text{Moles bromine} = 2 \cdot \text{wt Br}/159.81 \qquad d)$$

$$\text{Moles bromine} \approx 2 \cdot \text{wt \% Br} \ast [\text{wt Substrate}_{unbrominated}/(1-\text{wt \% Br})]/159.81 \qquad e)$$

In the above equations, the term "Substrate" refers to the SBSPD or SBSTD unbrominated product mixtures.

It is preferred to feed, as close as is possible, just the amount of bromine needed to obtain the wt % bromine desired. If, excess bromine is fed, then at least some of that excess will be in the crude reaction mass and will have to be removed in down-stream finishing steps.

Whatever the reason for the presence of excess bromine in the crude reaction mass, conventional techniques recognized in the art to remove such excess bromine can be used, e.g., using a reducing agent, e.g., sodium sulfite, to convert the bromine to water soluble bromide salts. However, it has been observed that the use of such reducing agents tends to encourage the formation of an emulsion and/or rag during some of the down-stream finishing steps. Such, emulsion or rag layer causes separation difficulties and process inefficiencies.

The product distribution of this invention, brominating agent and $AlBr_3$ feeds should be made beneath the surface of the reactor contents/reaction mass and in close proximity to each other. It is a principle of this invention that the bromination of the product distributions of this invention should occur quickly. The rates of reaction for the brominations of this invention are very fast due to reaction kinetics. Thus, in the processes of this invention, the rate-determining factor is the rate of mass transfer. Hence, the use of proximate feeds is designed so that the reactants and catalyst are close, one to the other. Another factor in assuring fast bromination is the feed of the $AlBr_3$ in solution with bromine. It is believed that the bromine preconditions the $AlBr_3$ to the active catalyst state so that the catalyst is active when first fed. One technique to ensure close proximity of the feeds is to provide that the feed tubes into the reactor contents/reaction mass be held together so that they discharge in adjacent parallel or in direct, impinging directions.

Having the feeds discharge beneath the reactor content/crude reaction mass liquid levels is beneficial as it ensures that there is heat dissipation away from the feeding area. Having a "hot spot" at the feeding area is to be avoided to the extent commercially possible. Again, stiffing of the reactor contents/crude reaction mass also aids in heat dispersion.

The amount of solvent pre-charge to the reactor should be that amount necessary to accomplish the heat dissipation function without burdening the process with higher than needed material handling expenses.

The feed rate of the individual feeds should be as high as is possible considering the reactor size and design, the heat that must be handled and the cooling available to assist in heat management, the feeding apparatus available and the ability to safely handle HBr by product gas. The higher the possible feed rates, the more efficient the process.

During the co-feed, the reactor contents/crude reaction mass should be kept at a temperature within the range of from about −20° C. to about 5° C. and preferably within the range of from about −10° C. to about 0° C. until substantially all the bromination has occurred. The feeds to the reactor are conveniently fed at about ambient temperature. To obtain the reactor contents/crude reaction mass temperatures mentioned above, the reactor is provided with adequate cooling. The temperature should be measured as close to the feed area as is practical.

The pressure in the reactor during the bromination is not critical, super-atmospheric pressures being the norm. However, very high pressures are not preferred in the context of equipment requirements and safety issues. Autogenous pressures are permissible.

Subsequent to the reactant and catalyst feeds, it is permissible to allow the reaction mass to experience a ride time to ensure that bromination has ceased. It is permissible, when brominating at about 74 wt % bromine, to allow the temperature to warm to about 7° C. to help facilitate consumption and react out as much of the fed bromine as is practical. It is also permissible, when brominating at about 78 wt % bromine, to allow the temperature to warm to about 25° C. to help facilitate consumption and react out as much of the fed bromine as is practical. This is particularly desirable where the practitioner decides to forgo the use of a bromine reducing agent during the initial aqueous quench so as to avoid any emulsion and rag layer difficulties.

After the feeds are completed and the ride time, if any, has passed, the crude reaction mass is removed from the reactor and quenched in water. As mentioned previously, if the crude reaction mass or, for that matter, any organic phase that is treated down-stream of the bromination, contains unreacted bromine, such bromine content can be lowered or eliminated by the use of a reducing agent to convert the bromine to water soluble bromide. But again, the use of such reducing agents, particularly the sulfites can cause emulsion formation, and can lead to a product with a higher ΔE value in the Hunter Solution Color Value Test. Therefore, it is recommended to not use bisulfite or sulfite, or any other sulfur-based bromine reducing agent.

The quench is conveniently performed at ambient temperature and generally speaking no heating other than the heat of solution of residual HBr is needed to effect a phase separation. Since bromine and other active brominating species can be present it is preferred to minimize heating of the mixture and to limit exposure to visible light. This assists, to some extent, in helping to ensure a low thermally labile bromine content.

The water quench does not have a ride time as the deactivation of the $AlBr_3$ and the reduction of bromine is nearly instantaneous as the crude reaction mass is fed to the quench water or quench water reducing agent solution. Once the quench is complete, two defined phases are formed, an aqueous phase and an organic phase. The organic phase contains solvent and the brominated styrenic polymer distribution of this invention, and will require further treatment.

After the water quench and phase separation and any additional bromine removal steps (water extraction or distillation) are complete, it is a preferred feature of this invention to wash the organic phase with a basic sodium borohydride solution. The borohydride and its borane by-products act to convert available active bromine species, including available unreacted brominating agent, e.g. bromine (if any should still be present), and any available derivatives formed from the unreacted brominating agent (e.g., hypobromites, and/or hypobromous acid) and also any available N-bromoamines, so that the bromine and active bromine species are reduced to bromide, and in the case of the N-bromides, this material is reduced to sodium bromide and free amine. The use of sodium borohydride to reduce bromine in the production of brominated polystyrenes is known. However, a novel feature of preferred processes of this invention is the use of a caustic solution of sodium borohydride to reduce the amount of N-bromoamine derived color bodies that accompany the brominated styrene polymer distribution. Thus, for the processes of this invention the sodium borohydride has a primary function, i.e., to reduce the amount of N-bromoamines present, and a secondary function, i.e., the reduction of any amount of bromine present. Thus, quantitatively, the amount of sodium borohydride used is that amount necessary to handle both functions. As used in this paragraph, the term "available", as used in connection with active bromine species, unreacted brominating agent, derivatives formed from the unreacted brominating agent, and N-bromoamines, denotes that the identified materials are not occluded within solids to such an extent that they cannot be removed simply by contact with the sodium borohydride solution.

As the caustic aqueous sodium borohydride solution is used to treat the organic phase, an aqueous phase is formed. The pH of the sodium borohydride solution is such that the formed aqueous phase has a pH between about 10 and about 14 throughout the period that the formed aqueous phase is in contact with the organic phase.

The preferred sodium borohydride content of the treating solution is within the range of from about 0.05 to about 1.0 wt % sodium borohydride, based on the total weight of the treating solution.

An important feature of the caustic sodium borohydride step is that a temperature above about 45° C. and preferably within the range of from about 54° C. to about 62° C. at one atmosphere is maintained during the treatment period. Experimentation has shown that room temperature does not obtain the high attenuation of N-bromoamine derived color bodies and thermally labile bromine that higher temperatures obtain.

The treatment temperature is maintained for at least that amount of time needed to obtain the benefits of the treatment, generally at least about 30 minutes has deemed to be more than sufficient. The practitioner can choose a lesser amount or a greater amount of time as suits his/her needs. Generally, experimentation has shown that the organic phase and aqueous mixture (during treatment, mixing is provided) will noticeably begin to thin at about 45° C. to 50° C. It is theorized that the N-bromides and any N-sulfides and/or N-oxides species present are quaternary and hence charged species or at least highly polar species. Such species are implicated in the thickening of the intimately mixed organic and basic aqueous phase. This is observed in an increased draw on the agitator drive used in the mixing. At a temperature above 45° C. and closer to 54° C. such thickening is eliminated and the draw on the drive is reduced. At temperatures below 45° C., thickening occurs and at times incomplete phase separation is observed. Once higher temperatures are achieved, the thickening phenomenon is eliminated, and phase separation is nearly instantaneous, especially when temperatures in excess of 54° C. are used.

The use of the above described aqueous caustic sodium borohydride treatment or wash can be used at any time after the water quench step and phase separation and on any recovered organic phase in the down stream, finishing sequence.

It is preferred to avoid substantial heating of the organic phase prior to the sodium borohydride treatment. Hence temperatures below 35° C. are preferred prior to the borohydride treatment.

After the final washing, the organic phase is separated from the aqueous phase. The brominated products of this invention are then isolated from the bromination solvent and any volatile impurities by devolatilization of some means. Methods that may be useful when dealing with low $T_g$ polymers, is to send the organic phase (after azeotropic drying to prevent corrosion issues) to a wiped film evaporator, a falling film evaporator, a continuous strip kettle or a devolatilization extruder where solvent can be rapidly removed and the resulting viscous melt can be easily manipulated and then granulated or pelletized.

When the brominated products of this invention having glass transition temperature ($T_g$) greater than about 100° C., the solution is fed to hot water, having a temperature in the range of from about 90° C. to about 100° C., to flash off the solvent present and to yield solids in the aqueous phase. This flashing off technique is well known in the art of producing brominated polystyrenics.

When precipitation from water with concurrent distillation of the bromination solvent is used, the resulting solids are separated from the water by conventional means, e.g. filtration and the like. The separated solids are then dried by conventional drying techniques, again keeping in mind the $T_g$ of the solids. The dried solids are the finished compositions of this invention.

Whether devolatilization by means of precipitation or by means of wiped film evaporator, a falling film evaporator, a continuous strip kettle or a devolatilization extruder, it is preferred to filter the azeotropically dried solution through activated acidic aluminum oxide. It has been found that about 1-5 parts by weight of aluminum oxide per 100 parts by weight of dissolved (contained) brominated styrene polymer is sufficient to remove impurities that contribute to reduced thermal color stability.

A general description of bromination procedures and variations in workup procedure used in the practice of this invention are described below and summarized in Table 1. A summary of the analyses performed on the substrates and brominated products formed in the Examples is set forth in Table 2.

Preparation for Bromination

Dry bromochloromethane (BCM, 5-30 ppm moisture by Karl Fisher) was prepared by azeotropically drying. All feed lines, feed tanks and glassware were dried (oven dried at 130° C. min 2 hour where appropriate) and purged with nitrogen over-night prior to use in the bromination reaction. All glassware, feed lines, and feed tanks are maintained under a $N_2$ atmosphere during the course of the set-up and the operation of the bromination reactor.

The amount of $AlBr_3$ catalyst (commercially available) needed to make a 0.25 mole % (calculated using the formula [moles $AlBr_3$/moles $Br_2$]*100%=0.25 mole % $AlBr_3$) solution of active catalyst was weighed and then transferred to oven dried reagent bottles in a nitrogen-purged glove box. By active catalyst, it is meant that amount of catalyst above any additional amount that would be otherwise deactivated by moisture either in the bromine itself or any other process stream involved in the bromination reaction. Bromine (5-10 ppm moisture content) was pumped into the reagent bottle containing the $AlBr_3$ and then stirred with a PTFE coated magnetic stirring bar for 30 minutes to assure homogeneous dissolution of the catalyst. The 0.25 mole % $AlBr_3$ in bromine solution was then transferred to a graduated feeding vessel placed on a large capacity laboratory balance.

The stripped branched styrene polymer distribution (SB-SPD) used was dissolved in dry (5-10 ppm moisture) BCM to make a 25 wt % solution. The solution was then charged to a graduated feeding vessel. The 0.25 mole % $AlBr_3$ in bromine and the 25 wt % SBSPD in BCM solution are co-fed via separate peristaltic pumps through ⅛" (3.2 mm) O.D. feed lines to a well-stirred fresh or recycle heel of anhydrous BCM at 0° C. to –10° C. The relative feed rates are constantly monitored such that ratio of the two reagents fed remains constant or near constant during the course of the electrophilic bromination reaction.

Bromination Equipment Set-up

A 5 L oil jacketed flask (bromination reactor) was equipped with an overhead glass stirrer shaft, PTFE stirring paddle, a water-cooled condenser, thermowell, nitrogen inlet, and bottom drain valve. The reactor was vented through a calcium sulfate moisture trap to a well-stirred caustic scrubber to absorb co-product HBr and entrained $Br_2$. Additionally the reactor was outfitted with three inlet lines: 1) ¼" (6.4 mm) O.D. PTFE BCM feed for initial feed of BCM to the reactor (the BCM can be either fresh or a BCM recycle heel from a previous run); 2) ⅛" (3.2 mm) O.D. substrate/BCM subsurface feed line; and 3) ⅛" (3.2 mm) O.D. $Br_2/AlBr_3$ subsurface feed line. The $AlBr_3/Br_2$ and SBSPD/BCM feed lines are secured such that both inlet lines discharge their contents in close proximity creating a locally high reagent concentration. The bromination reactor was completely covered with aluminum foil to exclude light and the reaction was conducted in a darkened ventilation hood.

The bromination reactor was placed above a 6-liter water quench vessel with a ⅜" (9.5 mm) O.D. PTFE drain line that connects the bottom drain valve of the bromination reactor to the quench vessel to allow for direct transfer of the bromination reactor's contents. The quench vessel was oil jacketed and equipped with an overhead stirring mechanism, thermowell and was baffled for intimate mixing of organic and aqueous phases. The quench vessel had a nitrogen inlet and was purged to a caustic scrubber. The quench vessel had a bottom drain valve to enable transfer of the pot's contents to an intermediate 5 liter storage vessel.

The intermediate storage vessel was piped to transfer its contents to a wash kettle. The wash kettle was a 6-liter oil-jacketed, baffled reactor outfitted with an overhead stirrer, thermocouple and bottom drain valve.

Product isolation set-up provides a water-containing vessel into which the product slurry is fed accompanied by the concomitant azeotropic removal of BCM. The precipitate from is passed through an oven for drying.

Example BR-19

Bromination of SBSPD1 with Sodium Borohydride Treatment of Unreacted Bromine

To the 5 L bromination reactor described above was charged 816 g of dry BCM (23 ppm moisture, Karl Fisher). The BCM was cooled in the dark to –2° C. and a previously prepared 25 wt % solution comprised of 350 g of a distilled SBSPD1 mixture ($M_w$=1405) and 1050 g of dry BCM was charged to a dry, 2000 mL $N_2$ blanketed graduated cylinder outfitted with a ⅛" (3.2 mm) O.D. PTFE feed line placed to transfer the entire content of the cylinder by means of a peristaltic metering pump to the bromination reactor. The previously prepared $AlBr_3$ (0.25 mol %) in bromine (1800 g) was transferred via a peristaltic pump into a 1.5 liter graduated cylinder. This feed vessel was maintained under a $N_2$ atmosphere and was outfitted with a ⅛" (3.2 mm) O.D. PTFE feed line placed to transfer the desired amount of bromine solution by means of a peristaltic metering pump to the bromination reactor.

The two reagents were co-fed at predetermine relative rates such that the entire content of the two feeds would have been charged simultaneously to be completed in 180 minutes. The feeds were interrupted on 60-minute intervals and transferred to the aqueous quench vessel thus providing an average residence time of 30 minutes. Ample cooling was provided through out the operation such that the reaction temperature remains close to –2° C. The transfer of the reaction mixture was affected by gravity to the 6 L quench vessel through the bottom drain valve and the ⅜" (9.5 mm) O.D. PTFE transfer line. The bromination reactor was then recharged with another 816 g of dry BCM and the feeds continued at –6 to –2° C. A second 60-minute co-feed and then a third 60-minute co-feed was conducted. Each time the reaction mass was quenched as below.

The quench vessel was previously charged with 1000 mL tap water (25° C.) and stirred at 400 rpm to assure intimate mixing of the organic and aqueous phase. The quench was exothermic and a 10° C. temperature rise was observed. 10% sodium bisulfite was added until the red color associated with elemental $Br_2$ was quenched. Agitation was stopped and the organic phase allowed time to separate and settle. The lower organic phase was physically separated and transferred to a 6 L wash vessel containing 1000 mL of 1% NaBH$_4$ in aqueous 10% NaOH and gently stirred at room temperature while the 2$^{nd}$ and then the 3$^{rd}$ portions of the co-feed were completed. Once all three portions of the co-feed had been combined in the wash vessel, agitation was increased. The mixture was heated to the reflux temperature of about 62° C. and stirred at or just below that temperature for about 30 minutes. During this period the thick emulsion that formed upon mixing the two phases thinned and the organic phase lost much of its dark color.

Agitation was interrupted and the bottom organic layer cut from the reactor. The organic layer was returned to the completely drained kettle and washed with 1000 mL of tap water until a pH of 10 was observed.

The organic solution was fed to a well-stirred 10-liter vessel containing fresh water with a pot temperature of 95° C. The product precipitated as BCM azeotropically distilled and was removed from the precipitator. The product was collected via vacuum filtration on a 3-liter coarse glass sintered glass filter funnel. The product was water washed twice (2×1000 mL) and left to dry on the funnel. The white filter cake (2400 g) was then dried in an oven under a nitrogen purge for 36 hours at 105° C. It was then dried further at reduced pressure (4 hrs, 105° C., 30 in. Hg vacuum) resulting in 1200 g of an off-white product, analyses of which are summarized in Table 4.

Example BR-20

Bromination of SBSPD1

The procedure of Example BR-19 was used except that the co-feeds were conducted using 1992 g of a 0.25 wt % AlBr$_3$.

The isolation procedure provided 2500 g of a wet cake which was then dried in an oven under a nitrogen purge for 36 hours at 105° C. It was then dried further at reduced pressure (4 hrs, 105° C., 30 in. Hg vacuum) resulting in 1247 g of an off-white product, analyses of which are summarized in Table 4.

Example BR-21

Bromination of SBSPD3c Alternate Isolation Procedure for Low T$_g$ Product

The procedure of Example BR-19 was used except that 500 g of SBSPD3c was combined with 1500 g of dry BCM and was co-fed with 1941.18 g of bromine containing 0.25 wt % AlBr$_3$. The co-feed was conducted in three 60 minute periods each feed was fed to 1266 grams of dry BCM.

Each of the three reactions mixtures were separately processed by feeding the reaction mixtures to the 5 liter quench vessel containing initially 1000 mL of fresh water. Unreacted Br$_2$ was reduced by the addition of 10% sodium bisulfite. The reaction mixture was then transferred to a wash reactor where it was washed with 10% NaOH and subsequently with fresh water until the pH of the wash water was ≦10. The three wash solutions were then combined and on a later date reworked. The combined material was divided in two portions. Each portion was separately treated with 1000 g of 0.2 wt % NaBH$_4$ in 2% NaOH at about 62° C. in the wash reactor with good agitation to assure mixing of the two phases. The organic phase was separated aqueous wash and then washed with fresh water until the pH of the wash was ≦10. The separate feeds were combined and concentrated to a volume of 3.8 liters.

The concentrate was devolatilized by passing it through a heated column at 185° C. BCM was distilled overhead and the product was collected as a melt containing about 2 wt % residual BCM. The melt (having a fishlike amine odor) was transferred to a 1 liter oil-jacketed resin kettle with a stainless steel agitator and a heated (heat trace tape) bottom drain valve. The mass was melted (130° C. oil-jacket temperature) with mixing under vacuum BCM was condensed overhead. The strip was continued as the jacket temperature was slowly increased to 180° C. as the pressure in the reactor was decreased. The strip was deemed complete when a vacuum of about 3 mmHg was achieved.

Nitrogen was bled into the resin kettle to restore an ambient inert atmosphere. The entire content of the resin kettle was then dropped as the melt through the heated valve into a vigorously stirred (2000 RPM) 2.5 gallon pail containing 2 gallons of tap water. The resulting granulated product was collected in a 3-liter glass filter funnel (coarse glass filter). The product was reslurried on the filter with 2 liters of methanol and filtered. Air was pulled through the filter cake to evaporate absorbed methanol. The wet cake was placed in drying trays and dried at 45° C. in a vacuum oven at 25 in Hg vacuum. The process yielded 1389.2 grams of product analyses of which are summarized in Table 4.

Example BR-22

Bromination of SBSPD3c

The procedure of Example BR-21 was used except that 500 g of SBSPD3c was combined with 1500 g of dry BCM and was co-fed with 2333.33 g of bromine containing 0.25 wt % AlBr$_3$. The co-feed was conducted in three 60 minute periods with each co-feed fed to 1333 g heel of dry BCM. The workup procedure was that of Example Br-22. The process yielded 1478.35 grams of product, analyses of which are summarized in Table 4.

Example BR-23

Bromination of SBSPD3b

The procedure of Example BR-21 was used except that 500 g of SBSPD3b was combined with 1500 g of dry BCM and was co-fed with 1941.18 g of bromine containing 0.25 wt % AlBr$_3$. The co-feed was conducted in three 60 minute periods with each co-feed fed to 1283 g heel of dry BCM. The workup procedure was that of Example Br-22. The process yielded 1345.7 grams of product, analyses of which are summarized in Table 4.

Example BR-24

Bromination of SBSPD3b

The procedure of Example BR-21 was used except that 500 g of SBSPD3b was combined with 1500 g of dry BCM and was co-fed with 2333.33 g of bromine containing 0.25 wt % AlBr$_3$. The co-feed was conducted in three 60 minute periods with each co-feed fed to 1283 g heel of dry BCM. The workup procedure was that of Example Br-22. The process yielded 1537.9 grams of product, analyses of which are summarized in Table 4.

Example BR-25

Bromination of SBSPD4b

The procedure of Example BR-21 was used except that 500 g of SBSPD4b was combined with 1500 g of dry BCM and was co-fed with 2125 g of bromine containing 0.25 wt % AlBr$_3$. The co-feed was conducted in three 60 minute periods with each co-feed fed to 1283 g heel of dry BCM. The workup procedure was that of Example Br-22. The process yielded 1466.05 grams of product analyses of which are summarized in Table 4.

Example BR-26

Bromination of SBSPD4b

The procedure of Example BR-21 was used except that 500 g of SBSPD4b was combined with 1500 g of dry BCM and was co-fed with 2571.43 g of bromine containing 0.25 wt % AlBr$_3$. The co-feed was conducted in three 60 minute periods with each co-feed fed to 1283 g heel of dry BCM. The workup procedure was that of Example Br-22. The process yielded 1697.4 grams of product analyses of which are summarized in Table 4.

Example BR-27

Bromination of SBSPD4b

The procedure of Example BR-20 was used except that 500 g of SBSPD4b was combined with 1500 g of dry BCM and was co-fed with 2846.15 g of bromine containing 0.25 wt % AlBr$_3$. The co-feed was conducted in three 60 minute periods with each co-feed fed to 1400 g heel of dry BCM. The workup procedure was that of Example Br-22. The process yielded 1791.25 grams of product analyses of which are summarized in Table 4.

Example BR-28

Bromination of SBSPD4b

The procedure of Example BR-21 was used except that 500 g of SBSPD4b was combined with 1500 g of dry BCM and was co-fed with 2125 g of bromine containing 0.25 wt % AlBr$_3$. The co-feed was conducted in three 60 minute periods with each co-feed fed to 1283 g heel of dry BCM. The workup procedure was that of Example Br-22. The process yielded 1468.85 grams of product analyses of which are summarized in Table 4.

Example BR-29

Bromination of SBSPD4b

The procedure of Example BR-21 was used except that 500 g of SBSPD4b was combined with 1500 g of dry BCM and was co-fed with 2571.43 g of bromine containing 0.25 wt % AlBr$_3$. The co-feed was conducted in three 60 minute periods with each co-feed fed to 1283 g heel of dry BCM. The workup procedure was that of Example Br-22. The process yielded 1647.2 grams of product analyses of which are summarized in Table 4.

Example BR-30

Bromination of SBSPD2

The procedure of Example BR-19 was used except that 340 g of SBSPD2 was combined with 1020 g of dry BCM and was co-fed with 2059.8 g of bromine containing 0.25 wt % AlBr$_3$. The co-feed was conducted in three 60 minute periods with each co-feed fed to 866 g heel of dry BCM. The process yielded 1159.75 grams of product analyses of which are summarized in Table 4.

Example BR-31

Bromination of SBSPD2

The procedure of Example BR-19 was used except that 296 g of SBSPD2 was combined with 888 g of dry BCM and was co-fed with 1995.78 g of bromine containing 0.25 wt % AlBr$_3$. The co-feed was conducted in three 60 minute periods with each co-feed fed to 1283 g heel of dry BCM. The process yielded 1074.45 grams of product analyses of which are summarized in Table 4.

Example BR-32

Bromination of SBSPD5c

The procedure of Example BR-21 was used except that 500 g of SBSPD5c was combined with 1500 g of dry BCM and was co-fed with 1985.07 g of bromine containing 0.25 wt % AlBr$_3$. The co-feed was conducted in three 60 minute periods with each co-feed fed to 1283 g heel of dry BCM. The workup procedure was that of Example Br-22. The process yielded 1357.3 grams of product analyses of which are summarized in Table 4.

Example BR-33

Bromination of SBSPD5c

The procedure of Example BR-21 was used except that 500 g of SBSPD5c was combined with 1500 g of dry BCM and was co-fed with 2389.83 g of bromine containing 0.25 wt % AlBr$_3$. The co-feed was conducted in three 60 minute periods with each co-feed fed to 1283 g heel of dry BCM. The workup procedure was that of Example Br-22. The process yielded 1552.6 grams of product analyses of which are summarized in Table 4.

Example BR-34

Bromination of SBSPD5b

The procedure of Example BR-21 was used except that 500 g of SBSPD5b was combined with 1500 g of dry BCM and was co-fed with 1985.07 g of bromine containing 0.25 wt % AlBr$_3$. The co-feed was conducted in three 60 minute periods with each co-feed fed to 1283 g heel of dry BCM. The workup procedure was that of Example Br-22. The process yielded 1382.5 grams of product analyses of which are summarized in Table 4.

Example BR-35

Bromination of SBSPD5b

The procedure of Example BR-21 was used except that 500 g of SBSPD5b was combined with 1500 g of dry BCM and was co-fed with 2389.3 g of bromine containing 0.25 wt % AlBr$_3$. The co-feed was conducted in three 60 minute periods with each co-feed fed to 1333 g heel of dry BCM. The workup procedure was that of Example Br-22. The process yielded 1561.4 grams of product analyses of which are summarized in Table 4.

Example BR-36

Bromination of SBSPD5c

The procedure of Example BR-21 was used except that 439.5 g of SBSPD5c was combined with 1318 g of dry BCM and was co-fed with 2501.77 g of bromine containing 0.25 wt % AlBr$_3$. The co-feed was conducted in three 60 minute periods with each co-feed fed to 1333 g heel of dry BCM. The workup procedure was that of Example Br-22. The work-up involved a heavy rag layer due to insoluble material. Multiple BCM washes of the rag were employed to recover as much product as possible. The washes were combined with the organic phase and treated as in Br-22. The process yielded 1264.95 grams of product analyses of which are summarized in Table 4.

In Table 4, Rxn denotes reaction, XRF denotes X-ray fluorescence test results, T$_g$ denotes glass transition temperature as determined by differential scanning calorimetry (DSC), TGA denotes thermogravimetric analysis, FP stands for final product, GPC denotes gel permeation chromatography result.

TABLE 4

| | | Bromination Example | | | | | |
|---|---|---|---|---|---|---|---|
| | | 19 | 20 | 21 | 22 | 23 | 24 |
| SBSPD Substrate | | 1 | 1 | 3c | 3c | 3b | 3b |
| SBSPD M$_w$ | | 1405 | 1405 | 580 | 580 | 605 | 605 |
| SBSPD PD | | 1.747 | 1.747 | 1.18 | 1.18 | 1.107 | 1.107 |
| SBSPD Substrate (g) | | 350 | 350 | 500 | 500 | 500 | 500 |
| Moisture (ppm) | | 139 | 139 | 12 ppm | 12 ppm | 8 | 8 |
| Wt % in BCM (g) | | 25 | 25 | 25 | 25 | 25 | 25 |
| Bromine (g) | | 1800 | 1992.31 | 1941.18 | 2333.3 | 1941.18 | 2333.33 |
| BCM in Reactor (g) | | 2450 | 2695 | 3800 | 4000 | 3850 | 3850 |
| Rxn Temp (range ° C.) | | −4 (−6~−2) | −4 (−6~−2) | −4(−5~−3) | −3.8 (−5~−3) | −4 (−6~−2.5) | −4 (−6~−2) |
| Average residence time (min) | | 30 | 30 | 30 | 30 | 30 | 30 |
| Weight after final strip (g) | | 1200.05 | 1247.8 | 1389.2 | 1478.35 | 1345.7 | 1537.9 |
| Residual BCM (ppm) | | 430 | <100 | 740 | 280 | 180 | 130 |
| XRF wt % Bromine | | 73.6 | 74.7 | 66.5 | 69.1 | 66.7 | 70.3 |
| T$_g$ ° C. (DSC) | | 140.77 | 152.44 | 58.23 | 67.87 | 66.4 | 80.27 |
| TGA (° C.) | 1% Wt. Loss (° C.) | 316.16 | 320.47 | 274 | 286.28 | 321.41 | 300.67 |
| | 5% Wt. Loss (° C.) | 358.7 | 365.6 | 331.2 | 338.68 | 353.84 | 346.3 |
| | 10% Wt. Loss (° C. | 373.73 | 378.13 | 352.38 | 356.89 | 366.56 | 361.63 |
| | 50% Wt. Loss (° C.) | 410.1 | 413.7 | 395.92 | 396.28 | 398.11 | 400.81 |
| Thermal HBr-FP 300° C. (ppm) | | 688 | 918 | 270 | 530 | 314 | 935 |
| GPC | M$_n$ | 3932 | 3921 | 1830 | 1870 | 1770 | 2130 |
| | M$_w$ | 4946 | 5030 | 1900 | 1990 | 1879 | 2270 |
| | M$_z$ | 6778 | 7003 | 1997 | 2175 | 2002 | 2554 |
| | PD | 1.26 | 1.28 | 1.04 | 1.06 | 1.06 | 1.06 |
| Hunter Solution Color | L | 97.83 | 96.01 | 95.48 | 94.82 | 89.01 | 90.43 |
| | a | −4.76 | −5.4 | −1.77 | −1.79 | 1.26 | 0.99 |
| | b | 16.54 | 21.96 | 15.02 | 15.94 | 22.54 | 21.56 |
| | ΔE | 17.16 | 22.82 | 15.78 | 16.86 | 25.27 | 23.74 |

| | | Bromination Example | | | | |
|---|---|---|---|---|---|---|
| | | 25 | 26 | 27 | 28 | 29 |
| SBSPD Substrate | | 4b | 4b | 4b | 4c | 4c |
| SBSPD M$_w$ | | 322 | 322 | 322 | 343 | 343 |
| SBSPD PD | | 1.172 | 1.172 | 1.172 | 1.18 | 1.18 |
| SBSPD Substrate (g) | | 500 | 500 | 500 | 500 | 500 |
| Moisture (ppm) | | 15 | 15 | 24 | 31 | 31 |
| Wt % in BCM (g) | | 25 | 25 | 25 | 25 | 25 |
| Bromine (g) | | 2125 | 2571.43 | 2846.15 | 2125 | 2571.43 |
| BCM in Reactor (g) | | 3850 | 3850 | 4200 | 3850 | 3850 |
| Rxn Temp (range ° C.) | | −2 (−5.5~−0.4) | −2 (−3~−0.2) | 31 2 (−4~−1) | −2 (−5.5~−0.4) | −2 (−4.5~−0.6) |
| Average residence time (min) | | 30 | 30 | 30 | 30 | 30 |
| Weight after final strip (g) | | 1466.05 | 1697.4 | 1791.25 | 1468.85 | 1647.2 |
| Residual BCM (ppm) | | 2790 | 1260 | 290 | 870 | 350 |
| XRF wt % Bromine | | 68.9 | 72.2 | 75.4 | 68.5 | 72.3 |
| T$_g$ ° C. (DSC) | | 42.82 | 60.98 | 84.36 | 53.6 | 70.63 |
| TGA (° C.) | 1% Wt. Loss (° C.) | 254.5 | 263.24 | 286.65 | 276.5 | 304.22 |
| | 5% Wt. Loss (° C.) | 310.5 | 319.23 | 340.13 | 326.92 | 345.69 |
| | 10% Wt. Loss (° C. | 333.68 | 340.96 | 359.3 | 346.65 | 360 |
| | 50% Wt. Loss (° C.) | 388.12 | 393.18 | 401.49 | 393.25 | 394.5 |
| Thermal HBr-FP 300° C. (ppm) | | 438 | 683 | 439 | 329 | 580 |
| GPC | M$_n$ | 1808 | 1940 | 1824 | 1480 | 1790 |
| | M$_w$ | 2199 | 2040 | 1962 | 1620 | 1910 |
| | M$_z$ | 2510 | 2275 | 2158 | 1875 | 2577 |
| | PD | 1.22 | 1.05 | 1.34 | 1.09 | 1.07 |
| Hunter Solution Color | L | 95.79 | 95.95 | 93.05 | 95.86 | 90.81 |
| | a | −3.51 | −3.1 | −3.57 | −3.21 | −0.95 |
| | b | 19.01 | 18.27 | 22.43 | 18.26 | 28.22 |
| | ΔE | 19.74 | 18.9 | 23.77 | 18.9 | 29.76 |

TABLE 4-continued

| | Bromination Example | | | | | | |
|---|---|---|---|---|---|---|---|
| | 30 | 31 | 32 | 33 | 34 | 35 | 36 |
| SBSPD Substrate | 2 | 2 | 5c | 5c | 5b | 5b | 5b |
| SBSPD $M_w$ | 1022 | 1022 | 457 | 457 | 495 | 495 | 495 |
| SBSPD PD | 1.4 | 1.4 | 1.332 | 1.332 | 1.3 | 1.3 | 1.3 |
| Wt % Br | 72 | 74 | 66.5 | 70.5 | 66.5 | 70.5 | 74 |
| SBSPD Substrate (g) | 340 | 295.8 | 500 | 500 | 500 | 500 | 439.5 |
| Moisture (ppm) | 90 | 90 | 12 | 12 | 8 | 8 | 10 |
| Wt % in BCM (g) | 25 | 25 | 25 | 25 | 25 | 25 | 25 |
| Bromine (g) | 2059.8 | 1995.78 | 1985.07 | 2389.83 | 1985.07 | 2389.3 | 2501.77 |
| BCM in Reactor (g) | 2600 | 2650 | 3850 | 3850 | 3800 | 4000 | 4000 |
| Rxn Temp (range ° C.) | −4 (−5~−3) | −4 (−6~−3.6) | −5 (−7~−3.4) | −4 (−6.5~−3) | −4 (−5~−3) | −4 (−5~−3) | −4 (−5~−2) |
| Average residence time (min) | 30 | 30 | 30 | 30 | 30 | 30 | 30 |
| Weight after final strip (g) | 1159.75 | 1074.45 | 1357.3 | 1552.6 | 1382.5 | 1561.4 | 1264.95 |
| Residual BCM (ppm) | <100 | 810 | 230 | 900 | 2380 | | |
| XRF-FP | 73 | 74.1 | 67.1 | 70.6 | 67.7 | 71.3 | 73.7 |
| $T_g$ ° C. (DSC) | 138.76 | 151 | 53.76 | 73.72 | 47.5 | 67.31 | 87.21 |
| TGA (° C.) 1% Wt. Loss (° C.) | 332.2 | 337.2 | 279.63 | 289.91 | 255 | 278.18 | 284.3 |
| 5% Wt. Loss (° C.) | 364.4 | 370 | 326 | 335.14 | 307 | 322.6 | 335 |
| 10% Wt. Loss (° C.) | 376.3 | 381.35 | 346.8 | 353.52 | 331 | 342.67 | 355.4 |
| 50% Wt. Loss (° C.) | 409.2 | 414.32 | 389.68 | 392.36 | 386.6 | 389.89 | 405.2 |
| Thermal HBr-FP 300° C. (ppm) | 241 | 233 | 193 | 330 | <50 | 334 | 606 |
| GPC $M_n$ | 3940 | 4340 | 2730 | 2550 | 2350 | 2930 | 2585 |
| $M_w$ | 2800 | 3100 | 2010 | 2440 | 2160 | 2740 | 2410 |
| $M_z$ | 5577 | 6404 | 6018 | 2748 | 2839 | 3172 | 2824 |
| PD | 1.41 | 1.4 | 1.36 | 1.05 | 1.09 | 1.07 | 1.07 |
| Hunter Solution Color L | 99.5 | 99.34 | 91.09 | 94.14 | 96.21 | 95.57 | insoluble |
| a | −1.77 | −2.01 | −1.13 | −1.84 | −1.38 | −1.81 | insoluble |
| b | 5.32 | 5.76 | 13.95 | 14.49 | 13.44 | 12.62 | insoluble |
| ΔE | 5.63 | 6.14 | 16.82 | 15.84 | 15.74 | 14.03 | |

Use of and Properties Achievable from the Flame Retardants of this Invention

As noted above, the brominated branched or star-branched styrene polymeric, telomeric, and monomeric product distributions of this invention (often referred to hereinafter as "flame retardants of this invention") can be used as flame retardants, especially in macromolecular substances such as thermoplastic polymers and thermoset polymers, as well as elastomers.

Illustrative polymers are: olefin polymers, cross-linked and otherwise, for example homopolymers of ethylene, propylene, and butylene; copolymers of two or more of such alkene monomers and copolymers of one or more of such alkene monomers and other copolymerizable monomers, for example, ethylene/propylene copolymers, ethylene/ethyl acrylate copolymers and ethylene/propylene copolymers, ethylene/acrylate copolymers and ethylene/vinyl acetate copolymers; polymers of olefinically unsaturated monomers, for example, polystyrene, e.g. high impact polystyrene, and styrene copolymers, polyurethanes; polyamides; polyimides; polycarbonates; polyethers; acrylic resins; polyesters, especially poly(ethyleneterephthalate) and poly(butyleneterephthalate); polyvinyl chloride; thermosets, for example, epoxy resins; elastomers, for example, butadiene/styrene copolymers and butadiene/acrylonitrile copolymers; terpolymers of acrylonitrile, butadiene and styrene; natural rubber; butyl rubber and polysiloxanes. The polymer may be, where appropriate, cross-linked by chemical means or by irradiation. The flame retardants of this invention can also be used in textile applications, such as in latex-based back coatings.

The amount of a flame retardant of this invention used in a formulation will be that quantity needed to obtain the flame retardancy sought. In general, the formulation and resultant product may contain from about 1 to about 50 wt % of bromine, introduced therein in the form of at least one flame retardant of this invention. Preferably, this amount is in the range of from about 5 to about 30 wt % of bromine, introduced into the substrate polymer in the form of at least one flame retardant of this invention. Masterbatches of polymer are formed from one or more flame retardants of this invention blended with additional amounts of substrate polymer. The amount of flame retardant of this invention used in a masterbatch ordinarily is in the range of 50 to 99 wt %.

It is advantageous to use the flame retardants of this invention in combination with one or more suitable flame retardant synergists, such as antimony-based synergists, e.g. $Sb_2O_3$. Generally, the flame retardants of this invention will be used with the antimony based synergists in a weight ratio ranging from about 1:1 to 7:1, and preferably of from about 2:1 to about 4:1.

Any of a number of conventional additives used in thermoplastic formulations may be used, in their respective conventional amounts, with the flame retardants of this invention. Examples of such conventional additives include plasticizers, antioxidants, fillers, pigments, UV stabilizers, lubricants, impact modifiers, and the like.

Various procedures for blending the flame retardants of this invention with substrate polymers can be used. Non-limiting examples of such procedures include melt blending, powder blending, and the like.

Thermoplastic articles formed from formulations containing a thermoplastic polymer and a flame retardant of this invention can be produced conventionally, e.g., by injection molding, extrusion molding, compression molding, and the like. Blow molding may also be appropriate in certain cases.

In one of the more particular embodiments of this invention, the flame retardants of this invention can be used in various styrenic polymers, including homopolymers and/or copolymers of various styrenic monomers which typically contain in the range of 6 to 10 aromatic carbon atoms. Examples of such monomers are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, the dimethylstyrenes, tert-butylstyrene, and analogous monomers. The flame retardants of this invention corresponding to Formulas (VII), (VIII), and (IX), and with a bromine content in the range of about 68 to about 79 wt %, are especially well suited for use in flame retarding impact modified polystyrenes (e.g., HIPS), styrene-acrylonitrile copolymers (SAN), and impact modified styrene-acrylonitrile copolymers (e.g., ABS). In these applications, flame retarded polymers of this invention possess a desirable balance of physical properties, including flame retardancy, thermal properties, impact properties, and rheological properties.

In another of the more particular embodiments of this invention, the flame retardants of this invention that are comprised of brominated styrene telomers corresponding to Formula (IX), and styrene adducts corresponding to Formula (VIII), products of this invention having molecular weight distributions in the range of for $M_n$ of about 520 to about to about 700, for $M_w$ of about 540 to about to about 710, and for $M_z$ of about 550 to about to about 750 and PD in the range of about 1.00 to about 1.05, are well suited for use in forming polyurethane foams, such as flexible polyurethane foams. Typically, such telomers and adducts of this invention are introduced into the polyurethane formulation prior to initiation of polymerization. Typically, the telomers and adducts of this invention are predissolved in a liquid phosphate flame retardant such as isopropylated triphenyl phosphates. For use in this manner, the preferred telomers and adducts corresponding to Formula (IX) are those which are derived from o-xylene. As is well known in the art, formulations used for preparing flexible polyurethane foams comprise as components or ingredients at least isocyanate, polyol, surfactant, catalyst, and blowing agent. The brominated telomers and adducts of this invention are deemed suitable for use as flame retardant components to be included with such formulations used for preparing polyurethanes. The catalyst is usually added to the formulation as the final ingredient so that polymerization occurs. When the brominated telomers or brominated adducts of this invention are introduced into the polyurethane formulation along with an alkylated triphenyl phosphate such as isopropylated triphenyl phosphate the resultant flexible polyurethane foam is characterized by having excellent scorch resistance. Alkylated triphenyl phosphates, as well as other known materials are known to also function as flame retardant synergists.

Among particular flame retarded compositions which can be formed by use of a flame retardant of this invention are the following:

A) A HIPS-based formulation containing a flame retardant amount of a brominated flame retardant of this invention. Such formulations can be composed of primarily HIPS or they can be an alloy of HIPS, such as a polyphenylene ether-HIPS blend. These are flame retarded compositions formed by blending a brominated flame retardant of this invention with the HIPS or alloy thereof.

B) An ABS-based formulation containing a flame retardant amount of a brominated flame retardant of this invention. Such formulations can be composed of primarily ABS or they can be an alloy of ABS, such as a polycarbonate-ABS blend. These are flame retarded compositions formed by blending a brominated flame retardant of this invention with the ABS or alloy thereof. C) A polyolefin-based formulation containing a flame retardant amount of a brominated flame retardant of this invention. Such polyolefin-based formulations include polyethylene, polypropylene, and ethylene or propylene copolymers with other olefinic monomers copolymerizable therewith. These are flame retarded compositions formed by blending a brominated flame retardant of this invention with a polyolefin homopolymer or copolymer.

D) An engineering thermoplastic-based formulation containing a flame retardant amount of a brominated flame retardant of this invention. These are flame retarded compositions formed by blending a brominated flame retardant of this invention with an engineering thermoplastic polymer or blend thereof.

E) A formulation as in D) wherein the engineering thermoplastic is a thermoplastic polyester. These are flame retarded compositions formed by blending a brominated flame retardant of this invention with a thermoplastic polyester or blend thereof.

F) A formulation as in D) wherein the engineering thermoplastic is a thermoplastic polyamide. These are flame retarded compositions formed by blending a brominated flame retardant of this invention with a polyamide thermoplastic or blend thereof.

G) A formulation as in any of A)-F) wherein the flame retardant amount is in the range of about 1 to about 95 wt % based on the total weight of the formulation.

H) A formulation as in any of A)-F) wherein the formulation additionally contains a synergistic amount of a flame retardant synergist.

I) A flame retarded thermoset resin composition which comprises a thermoset resin in which has been included a flame retardant amount of a brominated flame retardant of this invention.

J) A composition as in I) wherein said thermoset resin is a novolak resin.

The beneficial combination of properties that become manifest when a flame retardant of this invention is blended into a polymeric substrate such as a thermoplastic resin were demonstrated by a group of tests in which the substrate polymer was a high impact polystyrene (Dow® 801 high impact polystyrene resin). The materials tested, the tests utilized, and results of such tests are summarized in Table 5. In Table 5 (and in subsequent Table 6) Br—FR denotes brominated flame retardant of this invention, HDT denotes heat deflection temperature test results, and MFI denotes melt flow index test results.

TABLE 5

| | HIPS Example | | | | | | | | | | | |
|---|---|---|---|---|---|---|---|---|---|---|---|---|
| | 38 | 39 | 40 | 41 | 42 | 43 | 49 | 50 | 51 | 52 | 53 | 54 |
| BR- | 20 | 21 | 22 | 23 | 24 | 25 | 31 | 32 | 33 | 34 | 35 | 36 |
| SBSPD | 1 | 1 | 3c | 3c | 3b | 3b | 2 | 2 | 5c | 5c | 5b | 5b |
| Wt % Bromine XRF | 73.6 | 74.7 | 66.5 | 69.1 | 66.7 | 70.3 | 74.1 | 73 | 67.1 | 70.6 | 67.7 | 71.3 |
| $T_g$ Substrate (° C.) | 140.8 | 152.4 | 58.2 | 67.9 | 66.4 | 80.3 | 151 | 138.8 | 53.8 | 73.7 | 47.5 | 67.3 |

TABLE 5-continued

| | HIPS Example | | | | | | | | | | | |
|---|---|---|---|---|---|---|---|---|---|---|---|---|
| | 38 | 39 | 40 | 41 | 42 | 43 | 49 | 50 | 51 | 52 | 53 | 54 |
| Formulation (wt %) | | | | | | | | | | | | |
| Dow 801 (HIPS) | 82.4 | 82.6 | 80.8 | 81.3 | 80.9 | 81.7 | 82.5 | 82.3 | 80.8 | 81.6 | 81.2 | 81.7 |
| Brightsun HB (ATO) | 4 | 4 | 4.0 | 4.0 | 4.0 | 4.0 | 4 | 4 | 4.0 | 4.0 | 4.0 | 4.0 |
| Br-FR Loading | 13.6 | 13.4 | 15.2 | 14.7 | 15.1 | 14.3 | 13.5 | 13.7 | 15.2 | 14.4 | 14.8 | 14.3 |
| Thermal | | | | | | | | | | | | |
| HDT, 264 psi (° C.) | 74 | 74.3 | 69.3 | 70.7 | 70.2 | 71.3 | 74.6 | 73.5 | 69.2 | 70.8 | 68.3 | 69.9 |
| Vicat (° C.) | | | | | | | | | | | | |
| Impact | | | | | | | | | | | | |
| Izod Impact (ft-lb/in) | 1.19 | 1.26 | 1.34 | 1.37 | 1.36 | 1.34 | 1.28 | 1.28 | 1.39 | 1.43 | 1.37 | 1.40 |
| Gardner Impact (in-lb/in) | 29 | 31 | 23 | 27 | 26 | 29 | 32 | 28 | 26 | 21 | 28 | 28 |
| Flammability | | | | | | | | | | | | |
| UL-94, ⅛" rating | V-0 | V-0 | V0 | V0 | V0 | V0 | V-0 | V-0 | V0 | V0 | V0 | V0 |
| $t_1 + t_2$ (sec) | 10 | 11 | 13 | 8 | 9 | 8 | 9 | 21 | 13 | 10 | 11 | 10 |
| Rheological | | | | | | | | | | | | |
| MFI, 200° C./5 kg (g/10 min) | 10.4 | 9.4 | 17.2 | 15.7 | 15.7 | 14.1 | 10.1 | 10.6 | 15.7 | 17.4 | 19.4 | 14.1 |

As can be seen from the results summarized in Table 5, the flame retardants of this invention contribute effective flame retardancy as measured by the UL-94® test procedure, while providing substantially improved melt flow of the polymer resin without sacrifice of thermal properties such as heat distortion temperature (HDT) and thermal heat deflection as measured by Vicat performance. Additionally, the molded articles of this resin are off-white and have excellent impact properties as measured by the notched Izod Impact Test and the Gardner Impact Test.

Another group of tests was carried out in which the substrate polymer was an ABS polymer (Dow® 342EZ ABS). Once again, the beneficial combination of properties that become manifest when a flame retardant of this invention is blended into a polymeric substrate was demonstrated by these tests. The materials tested, the tests utilized, and results of such tests are summarized in Table 6.

TABLE 6

| | ABS Example. | | | | | |
|---|---|---|---|---|---|---|
| | 55 | 56 | 57 | 58 | 59 | 60 |
| BR | 20 | 21 | 22 | 23 | 24 | 25 |
| SBSPD | 1 | 1 | 3c | 3c | 3b | 3b |
| Wt % Bromine XRF | 73.6 | 74.7 | 66.5 | 69.1 | 66.7 | 70.3 |
| $T_g$ Substrate (° C.) | 140.8 | 152.4 | 58.2 | 67.9 | 66.4 | 80.3 |
| Formulation (wt %) | | | | | | |
| Dow 342 EZ (ABS) ( ) | 79.1 | 79.3 | 77.2 | 77.8 | 77.3 | 78.3 |
| Brightsun HB (ATO) | 4.5 | 4.5 | 4.5 | 4.5 | 4.5 | 4.5 |
| AT-181 | 0.1 | 0.1 | 0.1 | 0.1 | 0.1 | 0.1 |
| Br-FR Loading | 16.3 | 16.1 | 18.2 | 17.6 | 18.1 | 17.1 |
| PROPERTIES | | | | | | |
| Thermal | | | | | | |
| HDT, 264 psi (° C.) | 75.2 | 76.2 | 70.2 | 70.2 | 70 | 71.7 |
| Vicat (° C.) | 103.9 | 104.1 | | | | |
| Impact | | | | | | |
| Izod Impact (ft-lb/in) | 1.55 | 1.70 | 1.76 | 1.76 | 1.79 | 1.74 |
| Gardner Impact(in-lb/in) | 56 | 92 | 94 | 58 | 45 | 27 |

TABLE 6-continued

| Flammability | | | | | | |
|---|---|---|---|---|---|---|
| UL-94, ⅛" rating | V-0 | V-0 | V-0 | V-0 | V-0 | V-0 |
| $t_1 + t_2$ (sec) | 7 | 7 | 8 | 7 | 8 | 8 |
| Rheological | | | | | | |
| MFI, 200° C./5 kg | 10.5 | 9.6 | 12.9 | 11.7 | 12.6 | 10.5 |

| | ABS Example. | | | | |
|---|---|---|---|---|---|
| | 61 | 62 | 63 | 64 | 65 |
| BR | 26 | 27 | 28 | 29 | 30 |
| SBSPD | 4b | 4b | 4b | 4c | 4c |
| Wt % Bromine XRF | 68.9 | 72.2 | 75.4 | 68.5 | 72.3 |
| $T_g$ Substrate (° C.) | 42.8 | 61 | 84.4 | 53.6 | 70.6 |
| Formulation (wt %) | | | | | |
| Dow 342 EZ (ABS) | 78.0 | 78.7 | 79.5 | 77.8 | 78.7 |
| Brightsun HB (ATO) | 4.5 | 4.5 | 4.5 | 4.5 | 4.5 |
| AT-181 | 0.1 | 0.1 | 0.1 | 0.1 | 0.1 |
| Br-FR Loading | 17.4 | 16.7 | 15.9 | 17.6 | 16.7 |
| PROPERTIES | | | | | |
| Thermal | | | | | |
| HDT, 264 psi (° C.) | 69.4 | 71 | 72.3 | 69.9 | 71.7 |
| Vicat (° C.) | | | 99.9 | | |
| Impact | | | | | |
| Izod Impact (ft-lb/in) | 1.75 | 1.71 | 1.76 | 1.70 | 1.77 |
| Gardner Impact(in-lb/in) | 114 | 106 | 144 | 54 | 107 |
| Flammability | | | | | |
| UL-94, ⅛" rating | V-0 | V-0 | V-0 | V-0 | V-0 |
| $t_1 + t_2$ (sec) | 9 | 8 | 8 | 8 | 8 |
| Rheological | | | | | |
| MFI, 200° C./5 kg (g/10 min) | 14.4 | 12.9 | 11.8 | 15.8 | 11.5 |

| | ABS Example. | | | | | |
|---|---|---|---|---|---|---|
| | 66 | 67 | 68 | 69 | 70 | 71 |
| BR | 31 | 32 | 33 | 34 | 35 | 36 |
| SBSPD | 2 | 2 | 5c | 5c | 5b | 5b |

TABLE 6-continued

| | | | | | | |
|---|---|---|---|---|---|---|
| Wt % Bromine XRF-FP | 74.1 | 73 | 67.1 | 70.6 | 67.7 | 71.3 |
| $T_g$ Substrate (° C.) | 151 | 139 | 53.8 | 73.7 | 47.5 | 67.3 |
| Formulation (wt %) | | | | | | |
| Dow 342 EZ (ABS) | 79.2 | 79 | 77.2 | 78.2 | 77.6 | 78.2 |
| Brightsun HB (ATO) | 4.5 | 4.5 | 4.5 | 4.5 | 4.5 | 4.5 |
| AT-181 | 0.1 | 0.1 | 0.1 | 0.1 | 0.1 | 0.1 |
| Br-FR Loading | 16.2 | 16.4 | 18.2 | 17.2 | 17.8 | 17.2 |
| PROPERTIES | | | | | | |
| Thermal | | | | | | |
| HDT, 264 psi | 76.7 | 75.9 | 69.7 | 71.5 | 69.9 | 71.2 |
| Vicat | 103.9 | 103.7 | | | | |
| Impact | | | | | | |
| Izod Impact | 1.73 | 1.69 | 1.75 | 1.83 | 1.82 | 1.92 |
| Gardner Impact | 57 | 64 | 67 | 40 | 34 | 56 |
| Flammability | | | | | | |
| UL-94, 1/8" | V-0 | V-0 | V-0 | V-0 | V-0 | V-0 |
| $t_1 + t_2$ | 7 | 8 | 9 | 9 | 8 | 7 |
| Rheological | | | | | | |
| MFI, 230° C./3.8 kg | 9.8 | 10.3 | 13.5 | 13.0 | 14.5 | 13.6 |

As can be seen from the results summarized in Table 6, the flame retardants of this invention contribute effective flame retardancy as measured by the UL-94® test procedure, while providing substantially improved melt flow of the polymer resin without sacrifice of thermal properties such as heat distortion temperature (HDT) and thermal heat deflection as measured by Vicat performance. Additionally, the molded articles of this resin are off-white and have excellent impact properties as measured by the notched Izod Impact Test.

Analytical Methods

Known analytical methods can be used or adapted for use in assaying the characteristics of the compositions and formulations of this invention.

Total Bromine Content

Since the compositions of this invention have good, or at least satisfactory, solubility in solvents such as tetrahydrofuran (THF), the determination of the total bromine content for the compositions of this invention is easily accomplished by using conventional X-Ray Fluorescence techniques. The sample analyzed is a dilute sample, say 0.1 g+/−0.05 g in 60 mL THF. The XRF spectrometer can be a Phillips PW1480 Spectrometer. A standardized solution of bromobenzene in THF is used as the calibration standard. The total bromine values described herein and reported in the Examples are all based on the XRF analytical method.

Hunter Solution Color Value Test

To determine the color attributes of the flame retardant compositions of this invention, use is again made of the ability to dissolve these compositions in easy-to-obtain solvents, such as chlorobenzene. The analytical method entails weighing a 5 gram+/−0.1 g sample of the composition into a 50 mL centrifuge tube. To the tube also add 45 g+/−0.1 g chlorobenzene. Close the tube and shake for 1 hour on a wrist action shaker. After the 1 hour shaking period, examine the solution for undissolved solids. If a haze is present, centrifuge the solution for 10 minutes at 4000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a HunterLab Color Quest Sphere Spectrocolorimeter. A transmission cell having a 20-mm transmission length is used. The colorimeter is set to "Delta E-lab" to report color as ΔE and to give color values for "L", "a" and "b". Product color is determined as total color difference (ΔE) using Hunter L, a, and b scales for the 10% by weight concentrations of the product in chlorobenzene versus chlorobenzene.

Yellowness Index Hunter Colorimeter

Compositions of this invention were subjected to the analysis described in ASTM D 1925

$T_g$ Values $T_g$ values were obtained by DSC with a TA Instruments DSC Model 2920. Samples were heated to 400° C. at a rate of 10 C.°/min under nitrogen. $T_g$ is determined by noting the change in the specific heat of a polymer at the glass to rubber transition. This is a second order endothermic transition (requires heat to go through the transition). In DSC, the transition appears as a step transition and not a peak such as might be seen with a melting transition. See, *The Elements of Polymer Science and Engineering, An introductory Text for Engineers and Chemist*, Alfred Rudin, Academic Press, Orlando Fla., 1982, pg 403.

Thermogravimetric Analysis.

Thermogravimetric analysis (TGA) is also used to test the thermal behavior of the flame retardant compositions of this invention. The TGA values are obtained by use of a TA Instruments Thermogravimetric Analyzer. Each sample is heated on a Pt pan from 25° C. to about 600° C. at 10 C.°/min with a nitrogen flow of 50-60 mL/min.

Thermal Stability Test (Thermally Labile Bromine Test).

This test procedure essentially as described in U.S. Pat. No. 5,637,650. In conducting this test, each sample is run in duplicate. A 2.00 g+/−0.01 g sample is placed into a new clean 20 mm by 150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1 N NaOH and 5 drops of phenolphthalein. With a constant nitrogen purge at 0.5 SCFH, the test tube is heated at 300° C. in a molten salt bath (51.3% $KNO_3$/48.7% $NaNO_3$) for 15 minutes followed by 5 minutes at ambient temperature. The test tube containing the sample is then replaced with a clean dry test tube, and the apparatus is purged with nitrogen for an additional 10 minutes with the empty test tube in the 300° C. salt bath. The test tube, tubing and gas dispersion tubes are all rinsed with deionized water, and the rinse is combined quantitatively with the solutions in the three collection flasks. The combined solution is acidified with 1:1 $HNO_3$ and titrated with 0.01 N $AgNO_3$ using an automatic potentiometric titrator (Metrohm 670, 716, 736, or equivalent). Results are calculated as ppm in accordance with the equation:

HBr=(mL $AgNO_3$ to end point)·
(normality of $AgNO_3$)·(80912)/(sample wt.)

The tubing is thoroughly dried with nitrogen before the next analysis. Each day before the first sample, three empty clean test tubes are run as blanks to assure there is no residual hydrogen halide in the system.

GPC Molecular Weights for the Unbrominated Styrene Product Distributions

The $M_w$, $M_n$, $M_z$ and Pd values were obtained by GPC using a modular system with a Shimadzu autosampler (model SIL-9), a Shimadzu refractive index detector (model RID-6A), a Waters HPLC pump (model 510) and a Waters TCM column heater. The columns used were Polymer Labs (Varian) Oligopore columns, 300 mm by 7.5 mm, part number 1113-6520. The solvent used was tetrahydrofuran, HPLC grade. The test procedure used entailed dissolving approximately 0.10 g of sample in 10 mL of THF. An aliquot of this solution is filtered and 50 μL is injected on the columns. Based on isolated $C_{16}H_{17}$ and $C_{24}H_{25}$ (for xylene isomers), and $C_{17}H_{19}$ and $C_{25}H_{27}$ (for mesitylene) and the mode of separation is size exclusion, peaks are identified according to their order of elution as for xylenes: $C_{16}H_{17}$, $C_{24}H_{25}C_{32}H_{33}C_{40}H_{41}C_{48}H_{49}$, etc; and for mesitylene $C_{17}H_{19}$, $C_{25}H_{27}C_{33}H_{35}C_{41}H_{43}C_{49}H_{51}$, etc The individual peaks of the oligomeric material are then assigned molecular weight values based on their formula. A calibration curve is constructed using these values and their corresponding retention times. Based on this calibration, the overall distribution data is calculated and reported. The calculations were performed by the Viscotek Omnisec, version 4.2.0.237 gel permeation chromatography (GPC) data collection and processing system GPC Molecular Weights for Brominated Flame Retardants The $M_w$, $M_n$, $M_z$ and PD values were obtained by gel permeation chromatography (GPC) using an integrated multidetector GPC system manufactured by Viscotek Corporation. The system includes a combination pump and autosampler (model GPC-Max) along with an integrated detector system (model TDA) which includes a refractive index detector (RI) along with a dual angle light scattering detector. The columns used were Polymer Labs (Varian) Oligopore columns, 300 mm by 7.5 mm, part number 1113-6520. The solvent used was tetrahydrofuran, HPLC grade. The test procedure entails dissolving approximately 0.20 g of sample in 10 mL of THF. An aliquot of this solution is filtered and 50 μL is injected on the columns. Light scattering determinations require a single polystyrene standard for calibration. A polystyrene standard with a known molecular weight of 19,550 Daltons was used to calibrate the detector system. The software used to determine the molecular weight distribution was Viscotek Omnisec, version 4.2.0.237 gel permeation chromatography (GPC) data collection and processing system.

Analytical Methods for Molding Articles:

HDT was determined by ASTM D 648; Vicat, ° C. by ASTM D 1525; Izod Impact by ASTM D 256; Melt Flow Index by ASTM D 1238; and UL-94, ⅛" (3.2 mm) rating by UL-94. Color properties were determined by ASTM D 1925.

The flame retardant compositions of this invention are used with flame retarding synergist. These synergists are those that are commonly used with aryl brominated flame retardants and are well know in the art. Exemplary of such synergists are iron oxide, zinc borate, or, preferably, antimony oxide synergist, such as, antimony trioxide, antimony pentoxide, potassium antimonite, sodium antimonite. The amount of flame retardant synergist, when used, generally will be in the range of up to about 12 wt % based on the total weight of the HIPS or ABS based formulation. Synergist amounts will most often fall within the range of from about 1 to about 6 wt %. Departures from the foregoing ranges of proportions are permissible whenever deemed necessary or desirable under the particular circumstances at hand, and such departures are within the scope and contemplation of this invention.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Each and every patent or publication referred to in any portion of this specification is incorporated in toto into this disclosure by reference, as if fully set forth herein.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text taken in context clearly indicates otherwise.

The invention may comprise, consist or consist essentially of the materials and/or procedures recited herein.

This invention is susceptible to considerable variation in its practice. Therefore the foregoing description is not intended to limit, and should not be construed as limiting, the invention to the particular exemplifications presented hereinabove.

The invention claimed is:

1. A brominated flame retardant composition which comprises a brominated aromatic substrate distribution formed from a polymethylated benzene having 2 to 4 methyl groups in the molecule, and styrene, said brominated aromatic substrate distribution having the formula:

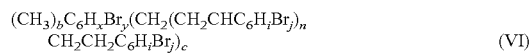

$$(CH_3)_bC_6H_xBr_y(CH_2(CH_2CHC_6H_iBr_j)_n \\ CH_2CH_2C_6H_iBr_j)_c \qquad (VI)$$

wherein each $C_6H_iBr_j$ is a brominated phenyl group and each $C_6H_xBr_y$ is a brominated substituted phenyl group and for each molecule of said formula, n is a whole number and is independently in the range of $0 \leq n \leq 8$; b is, independently, a whole number in the range of 0 to 3; c is, independently, a whole number in the range of 1 to 4 and wherein when b=0, c is in the range of 2 to 4; x is, independently, a whole number in the range of 0 to 3; y is, independently, a whole number in the range 1 to 4; i is, independently, a whole number in the range 0 to 4; j is, independently, a whole number in the range of 1 to 5; and the sum of x+y+b+c=6 and the sum of i+j=5 for any discrete $C_6H_iBr_j$ brominated phenyl group, and wherein said distribution is further characterized by having an $M_n$ in the range of about 420 to about 3300, an $M_w$ in the range of about 420 to about 6250, an $M_z$ in the range of about 420 to about 10937, and a PD in the range of about 1.00 to about 2.00, and wherein the weight percent of bromine as determined by XRF in the brominated product distribution is in the range of about 45 wt % to about 79 wt %.

2. A brominated flame retardant composition as in claim 1 wherein said distribution is further characterized by having an $M_n$ in the range of about 900 to about 3300, an $M_w$ in the range of about 1100 to about 6600, an $M_z$ in the range of about 1250 to about 11000, and a PD in the range of about 1.0 to about 2.0, and wherein the weight percent of bromine as determined by XRF in the brominated product distribution is in the range of about 68 wt % to about 74 wt %.

3. A brominated flame retardant composition as in claim 1 wherein n is a whole number and is in the range of $0 \leq n \leq 4$ and wherein said distribution is further characterized by having an $M_n$ in the range of about 420 to about 2300, an $M_w$ in the range of about 420 to about 3100, an $M_z$ in the range of about 452 to about 4000, and a PD in the range of about 1.00 to about 2.00.

4. A brominated flame retardant composition as in claim 1 wherein said brominated aromatic substrate distribution has the formula:

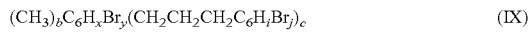   (IX)

wherein each $C_6H_iBr_j$ is a brominated phenyl group and each $C_6H_xBr_y$ is a brominated substituted phenyl group and for each molecule of said formula, b is, independently, a whole number in the range of 0 to 3; c is, independently, a whole number in the range of 1 to 4 except that when b=0, c is in the range of 2 to 4; x is, independently, a whole number in the range of 0 to 3; y is, independently, a whole number in the range of 1 to 4; i is, independently, a whole number in the range of 0 to 4; j is, independently, a whole number in the range of 1 to 5; and the sum of x+y+b+c=6 and the sum of i+j=5 for any discrete $C_6H_iBr_j$ brominated phenyl group, and wherein said distribution is further characterized by having an $M_n$ in the range of about 420 to about 1420, an $M_w$ in the range of about 420 to about 1420, an $M_z$ in the range of about 420 to about 1420, and a PD in the range of about 1.00 to about 2.00.

5. A composition as in claim 1 which further comprises a mixture of branched or star-branched styrenic coproduct distributions of the Formula X below:

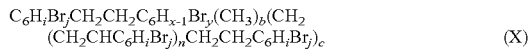   (X)

wherein the amount of such styrenic coproduct distributions is in the range of 0 to 5 GPC area % and wherein each $C_6H_iBr_j$ is a brominated phenyl group and each $C_6H_{x-1}Br_y$ is a brominated substituted phenyl group; n is a whole number and is independently in the range of $0 \leq n \leq 8$; x is, independently, a whole number in the range of 1 to 2; y is, independently, a whole number in the range of 1 to 3; b is, independently, a whole number in the range of 0 to 4; c is, independently, a whole number in the range of 0 to 4 except that when b=0, c is in the range of 2 to 4; i is, independently, a whole number in the range of 0 to 4; j is, independently, a whole number in the range of 1 to 5; and the sum of x+y+b+c=5 and the sum of i+j=5 for any discrete $C_6H_iBr_j$ brominated phenyl group, the bromine content of said composition being in the range of about 45 wt % to about 79 wt %.

6. A brominated flame retardant composition as in claim 1 further characterized in that the brominated aromatic substrate distribution complies with at least one of (a), (b), (c), (d) as follows:
(a) the brominated aromatic substrate distribution does not have a TGA weight loss of 5% until a temperature greater than 350° C. is reached;
(b) the brominated aromatic substrate distribution has a thermal HBr value at 300° C. in the range of below the detection limit of 50 ppm to no more than about 200 ppm;
(c) the brominated aromatic substrate distribution has a ΔE value in the Hunter Solution Color Value Test in the range of 3 to 17;
(d) the brominated aromatic substrate distribution has a glass transition temperature in the range of about 40° C. to about 160° C.

7. A flame-retarded polymer formulation containing a flame retardant amount of the composition of any of claim 1, 4, 5 or 6 wherein (i) optionally said flame retardant amount is in the range of 1 to 95 wt % based on the total weight of the formulation; (ii) optionally the formulation additionally contains a synergistic amount of a flame retardant synergist which is an antimony-containing synergist, and (iii) optionally said synergist, if present, being present in an amount in the range of about 1 to about 12 wt % based on the total weight of the formulation, said flame-retarded polymer formulation being (a) a HIPS-based formulation, or (b) an ABS-based formulation, or (c) a polyolefin-based formulation, or (d) a thermoset resin composition, a novolak resin, or (e) an engineering thermoplastic-based formulation, a thermoplastic polyester or a thermoplastic polyamide.

8. A formulation for the preparation of polyurethane, which formulation is characterized by containing, as a flame retardant, a brominated flame retardant composition which comprises a brominated aromatic substrate distribution formed from a polymethylated benzene having 2 to 4 methyl groups in the molecule, and styrene, said brominated aromatic substrate distribution having the formula:

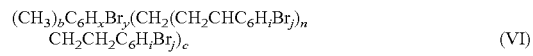   (VI)

wherein each $C_6H_iBr_j$ is a brominated phenyl group and each $C_6H_xBr_y$ is a brominated substituted phenyl group and for each molecule of said formula, n is a whole number and is independently in the range of $0 \leq n \leq 4$; b is, independently, a whole number in the range of 0 to 3; c is, independently, a whole number in the range of 1 to 4 and wherein when b=0, c is in the range of 2 to 4; x is, independently, a whole number in the range of 0 to 3; y is, independently, a whole number in the range of 1 to 4; i is, independently, a whole number in the range of 0 to 4; j is, independently, a whole number in the range of 1 to 5; and the sum of x+y+b+c=6 and the sum of i+j=5 for any discrete molecule $C_6H_iBr_j$ brominated phenyl group, and wherein said distribution is further characterized by having an $M_n$ in the range of about 420 to about 2300, an $M_w$ in the range of about 420 to about 3100, an $M_z$ in the range of about 452 to about 4000, and a PD in the range of about 1.00 to about 2.00 and wherein said formulation optionally further comprises at least one flame retardant synergist which is an alkylated triphenylphosphate.

9. A formulation for the preparation of polyurethane, which formulation is characterized by containing, as a flame retardant, a brominated flame retardant composition which comprises a brominated aromatic substrate distribution which complies with at least one of (1) or (2) as follows:
(1) a brominated aromatic substrate distribution as in claim 4; or
(2) a brominated aromatic substrate distribution as in claim 5;
and wherein said formulation optionally further comprises at least one flame retardant synergist which is an alkylated triphenylphosphate.

* * * * *

UNITED STATES PATENT AND TRADEMARK OFFICE
CERTIFICATE OF CORRECTION

PATENT NO. : 8,476,373 B2  Page 1 of 1
APPLICATION NO. : 13/130105
DATED : July 2, 2013
INVENTOR(S) : Layman, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 27 days.

Signed and Sealed this
Eighth Day of September, 2015

Michelle K. Lee
*Director of the United States Patent and Trademark Office*